United States Patent
Kaneko

(10) Patent No.: US 9,800,674 B2
(45) Date of Patent: Oct. 24, 2017

(54) INFORMATION PROCESSING TERMINAL, CONTROL METHOD THEREFOR, AND NON-TRANSITORY COMPUTER-READABLE MEDIUM

(71) Applicant: CANON KABUSHIKI KAISHA, Tokyo (JP)

(72) Inventor: Tsuyoshi Kaneko, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 14/511,816

(22) Filed: Oct. 10, 2014

(65) Prior Publication Data
US 2015/0127800 A1    May 7, 2015

(30) Foreign Application Priority Data
Nov. 6, 2013  (JP) ................. 2013-230526

(51) Int. Cl.
*H04L 29/08*    (2006.01)
(52) U.S. Cl.
CPC .............. *H04L 67/16* (2013.01); *H04L 67/02* (2013.01); *H04L 67/36* (2013.01)
(58) Field of Classification Search
CPC ......... H04L 41/50; H04L 67/02; H04L 67/16; H04L 67/28; H04L 67/2804; H04L 67/2809; H04L 67/2814; H04L 67/2819; H04L 67/2838; H04L 67/2861; H04L 67/32; H04L 67/327; H04L 67/2823; H04L 67/303; H04L 12/5835; H04L 51/066; H04L 67/025; H04L 67/10;
(Continued)

(56) References Cited

U.S. PATENT DOCUMENTS 8,473,558 B2 *  6/2013  Goldstein ......... G06F 17/30905
                                            709/206
9,104,357 B2 *  8/2015  Nishikawa ............. G06F 3/122
(Continued)

FOREIGN PATENT DOCUMENTS

JP    2003-208367 A    7/2003
JP    2011-090391 A    5/2011
(Continued)

OTHER PUBLICATIONS

Japanese Office Action issued in corresponding application No. 2013230526 on Aug. 25, 2017.

*Primary Examiner* — Greg C Bengzon
(74) *Attorney, Agent, or Firm* — Carter, DeLuca, Farrell & Schmidt, LLP

(57) ABSTRACT

An information processing terminal having a relay function of relaying, via a network, a client for managing data and a service for providing a function using the data managed by the client, comprises: a receiving unit which, upon receiving function information for calling the function provided by the service by the relay function, receives reference information pertaining to providing of the function information; a register unit which executes registration processing of the received function information; and a providing unit which provides a user with the function information registered by the registration processing according to at least one of a display order and a display position based on the reference information.

9 Claims, 22 Drawing Sheets

(58) Field of Classification Search
CPC .......... H04L 67/1023; H04L 67/2842; H04L 67/2895; H04L 67/306; H04L 67/34; H04L 67/36; G06F 8/60; G06F 3/0482; G06F 3/0484; G06F 3/1203; G06F 3/1204; G06F 3/123; G06F 3/1237; G06F 3/1241; G06F 3/1253; G06F 3/1254; G06F 3/1255; G06F 3/1265; G06F 3/1275; G06F 3/1276; G06F 3/128; G06F 3/1281; G06F 3/1285; G06F 3/1292; G06F 3/1296; G06F 3/13; G06F 17/30905; G06F 3/048; G06F 3/484; G06F 17/2247; G06F 17/30274; G06F 17/30899; G06F 3/1288; G06F 3/1205; G06F 3/1287; G06F 3/04842; G06F 3/04845; G06F 3/1242; G06F 3/126; G06F 3/1272; G06F 17/3028

See application file for complete search history.

(56) References Cited

U.S. PATENT DOCUMENTS

| | | | | |
|---|---|---|---|---|
| 9,258,445 | B2* | 2/2016 | Nakayama | G06F 3/1222 |
| 9,310,981 | B2* | 4/2016 | Lynch | G06F 9/44505 |
| 9,317,227 | B2* | 4/2016 | Yamagishi | G06F 3/1208 |
| 9,372,648 | B2* | 6/2016 | Nakajima | G06F 3/1238 |
| 9,377,979 | B1* | 6/2016 | Hansen | G06F 3/1203 |
| 9,483,716 | B2* | 11/2016 | Abe | G06F 3/1208 |
| 9,514,492 | B2* | 12/2016 | Aiglstorfer | G06Q 40/00 |
| 9,578,391 | B2* | 2/2017 | Kim | H04L 65/4076 |
| 9,665,314 | B2* | 5/2017 | Armstrong | G06F 3/1205 |
| 2005/0278421 | A1* | 12/2005 | Simpson | H04L 29/06 709/203 |
| 2008/0196046 | A1* | 8/2008 | Athas | G06F 17/30905 719/320 |
| 2008/0300996 | A1* | 12/2008 | Fei | G06Q 30/0601 705/26.8 |
| 2008/0313273 | A1 | 12/2008 | Wang | |
| 2009/0055749 | A1* | 2/2009 | Chatterjee | G06F 3/04817 715/738 |
| 2009/0222842 | A1* | 9/2009 | Narayanan | G06F 9/542 719/328 |
| 2009/0303676 | A1* | 12/2009 | Behar | G06F 1/162 361/679.27 |
| 2011/0012929 | A1* | 1/2011 | Grosz | G06F 17/3028 345/661 |
| 2011/0093580 | A1* | 4/2011 | Nagasaka | G06F 8/60 709/223 |
| 2012/0036264 | A1* | 2/2012 | Jiang | G06F 17/30902 709/226 |
| 2012/0036507 | A1* | 2/2012 | Jonnala | G06Q 30/02 717/178 |
| 2012/0174002 | A1* | 7/2012 | Martin | G06F 8/38 715/763 |
| 2012/0206757 | A1* | 8/2012 | Kawabata | H04L 67/02 358/1.14 |
| 2013/0003106 | A1* | 1/2013 | Nishida | G06F 3/1222 358/1.14 |
| 2013/0124606 | A1* | 5/2013 | Carpenter | H04L 67/06 709/203 |
| 2013/0191810 | A1* | 7/2013 | Brandstetter | G06F 8/34 717/109 |
| 2013/0311875 | A1* | 11/2013 | Pappas | G06F 17/2247 715/234 |
| 2013/0321861 | A1* | 12/2013 | Ishihara | G06F 3/1224 358/1.15 |
| 2014/0032759 | A1* | 1/2014 | Barton | H04L 67/10 709/225 |
| 2014/0040070 | A1* | 2/2014 | Pereymer | G06F 17/2247 705/26.8 |
| 2014/0049790 | A1* | 2/2014 | Nakamura | G06F 3/1298 358/1.13 |
| 2014/0068779 | A1* | 3/2014 | Tan | G06F 21/606 726/26 |
| 2014/0075335 | A1* | 3/2014 | Hicks | G06Q 10/10 715/753 |
| 2014/0096041 | A1* | 4/2014 | Gowen | G06F 3/0484 715/753 |
| 2014/0108956 | A1* | 4/2014 | Varenhorst | G06F 3/04842 715/748 |
| 2014/0129733 | A1* | 5/2014 | Klais | H04L 67/327 709/239 |
| 2014/0139878 | A1* | 5/2014 | Kadota | G06K 15/183 358/1.15 |
| 2014/0156784 | A1* | 6/2014 | Buck | H04L 67/1095 709/217 |
| 2014/0189116 | A1* | 7/2014 | Niimura | H04L 67/2871 709/225 |
| 2014/0189117 | A1* | 7/2014 | Niimura | H04L 29/06 709/225 |
| 2014/0229839 | A1* | 8/2014 | Lynch | G06F 9/44505 715/736 |
| 2014/0280484 | A1* | 9/2014 | Klemenz | H04L 67/10 709/203 |
| 2014/0280723 | A1* | 9/2014 | Gokul | H04L 67/16 709/217 |
| 2014/0282016 | A1* | 9/2014 | Hosier, Jr. | H04W 4/08 715/733 |
| 2014/0310654 | A1* | 10/2014 | Jeon | G06F 9/4843 715/825 |
| 2014/0327929 | A1* | 11/2014 | Bibhu | G06F 3/1253 358/1.15 |
| 2014/0337495 | A1* | 11/2014 | Branton | G06F 17/30 709/223 |
| 2015/0020079 | A1* | 1/2015 | Berry | G06F 9/547 719/313 |
| 2015/0052195 | A1* | 2/2015 | Li | H04L 67/06 709/203 |
| 2015/0088942 | A1* | 3/2015 | Shah | G06F 17/30238 707/827 |
| 2015/0124282 | A1* | 5/2015 | Minagawa | G06F 3/1222 358/1.15 |
| 2015/0128110 | A1* | 5/2015 | Falk | G06Q 10/10 717/128 |
| 2015/0142968 | A1* | 5/2015 | Bhagwat | H04L 67/16 709/224 |
| 2015/0199161 | A1* | 7/2015 | Gutnik | G06F 3/1296 358/1.15 |
| 2015/0212990 | A1* | 7/2015 | Tseng | G06F 9/4443 715/234 |
| 2015/0286451 | A1* | 10/2015 | Armstrong | G06F 3/1205 358/1.15 |
| 2015/0365469 | A1* | 12/2015 | Procopio | H04L 67/10 709/217 |

FOREIGN PATENT DOCUMENTS

| | | |
|---|---|---|
| JP | 2013-012110 A | 1/2013 |
| JP | 2013-196356 A | 9/2013 |

* cited by examiner

F I G. 1
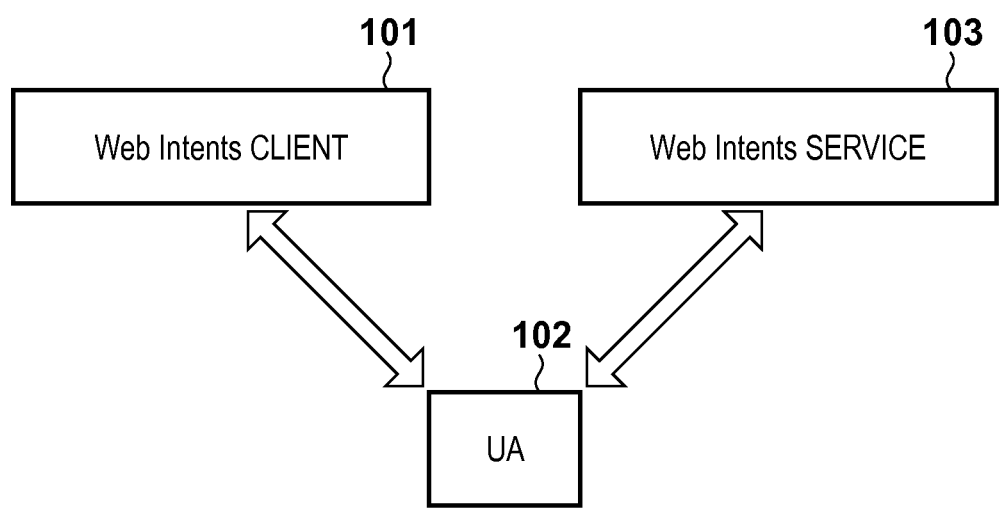

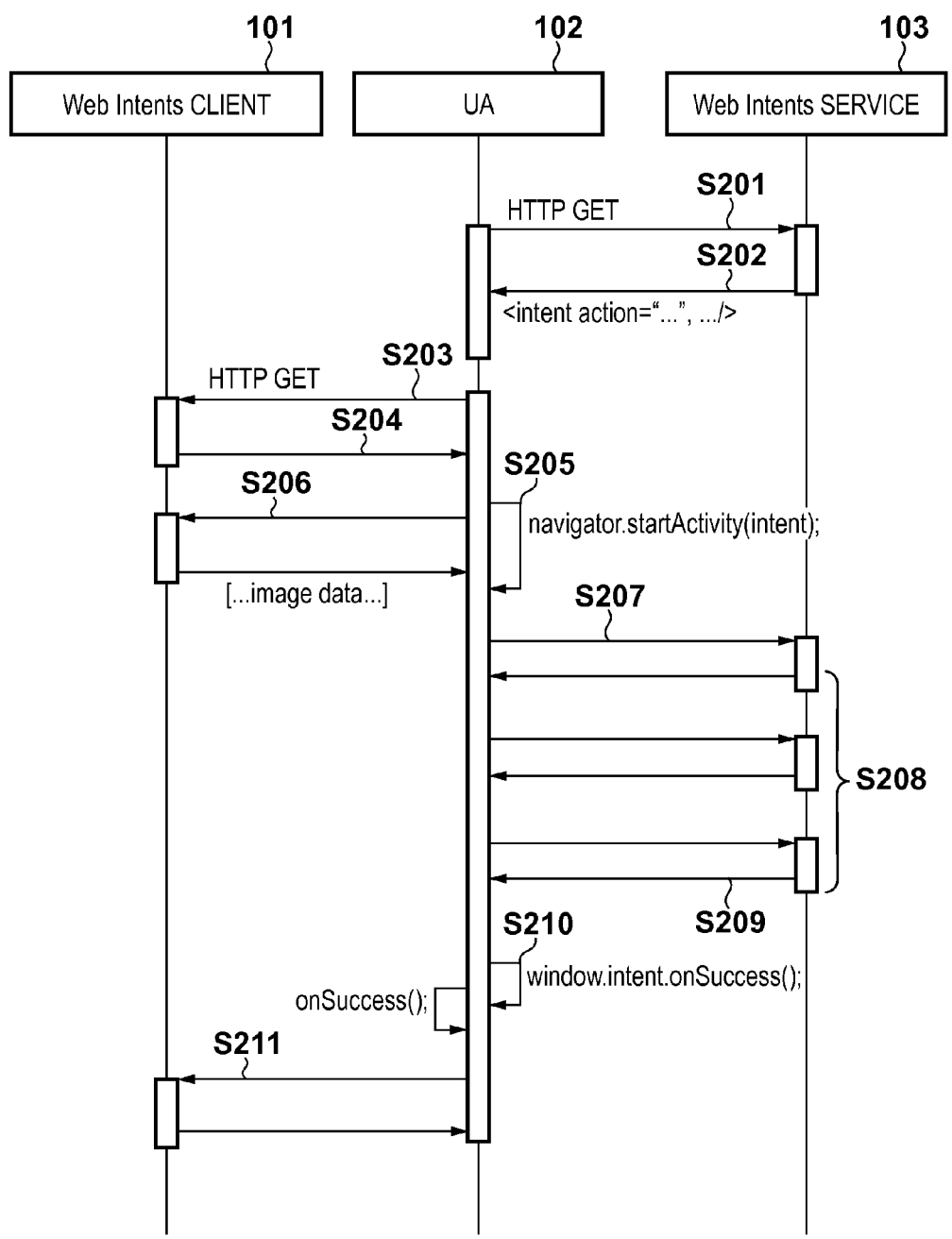

FIG. 3

```
<intent
  action="http://webintents.org/share"
  type="image/ "
  href="share.html"
  title="Share image using e-mail"
  disposition="window"
/>
```

FIG. 4

```
document.getELementById('share-photo').addEventListener(
  "click", function() {
    var intent = new Intent(
      {"action": "http://webintents.org/share",
       "type" : "image/jpeg",
       "data" : getImageFrom( . . . )});
    navigator.startActivity(intent, onSuccess);
}, false);
```

FIG. 5

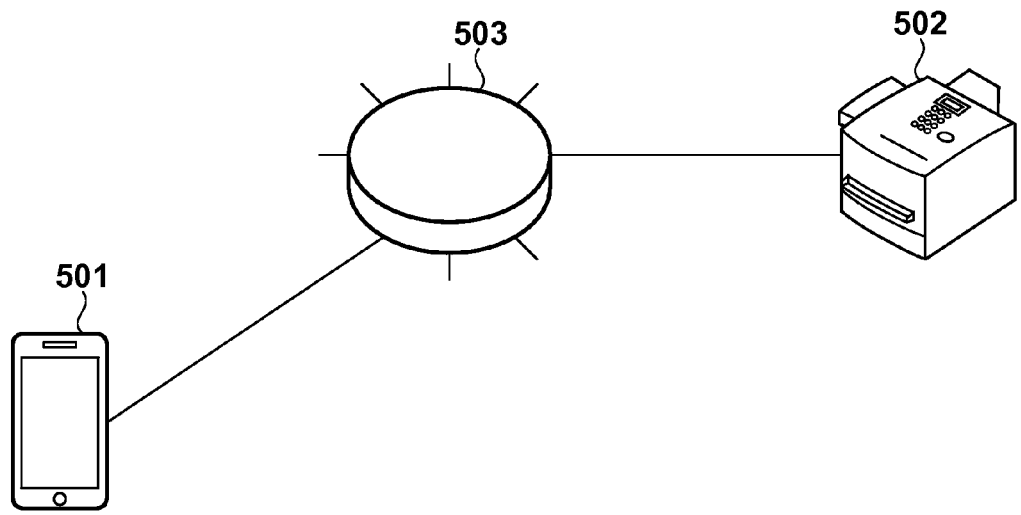

FIG. 8A

| item | value |
|---|---|
| model | aa-04e |
| os version | 5.2.3 |
| karnel version | 1.2.3-45678 |
| serial number | aaaaaaaaaa1 |
| vendor | BBB |

800 (801: item, 802: value)

FIG. 8B

| Service ID | action | type | href | title | dis-position | vendor | extend |
|---|---|---|---|---|---|---|---|
| 1 | print | image/* | http://www/aaa_print.html | aaa Print Service | window | AAA | |
| 2 | edit | image/jpg | http://www/bbb_edit.html | bbb Edit Service | inline | BBB | |
| 3 | print | image/* | http://www/bbb_print.html | bbb Print Service | window | BBB | cl,duplex,staple |
| 4 | print | image/* | http://www/ccc_print.html | ccc Print Service | window | CCC | |
| 5 | pick | image/* | http://www/aaa_pick.html | aaa Pick Service | window | AAA | |

```
<intent
  action="http://webintents.org/print"
  type="image/*"
  href="https://print.html"
  title="Print by xxx-1234"
  disposition="window"
  vendor="AAA"
  extend="cl,duplex,staple"
/>
```

FIG. 8D

| extend | function |
|---|---|
| cl | COLOR DEVICE |
| duplex | DOUBLE-SIDED PRINTING |
| staple | STAPLING |

820 (821: extend, 822: function)

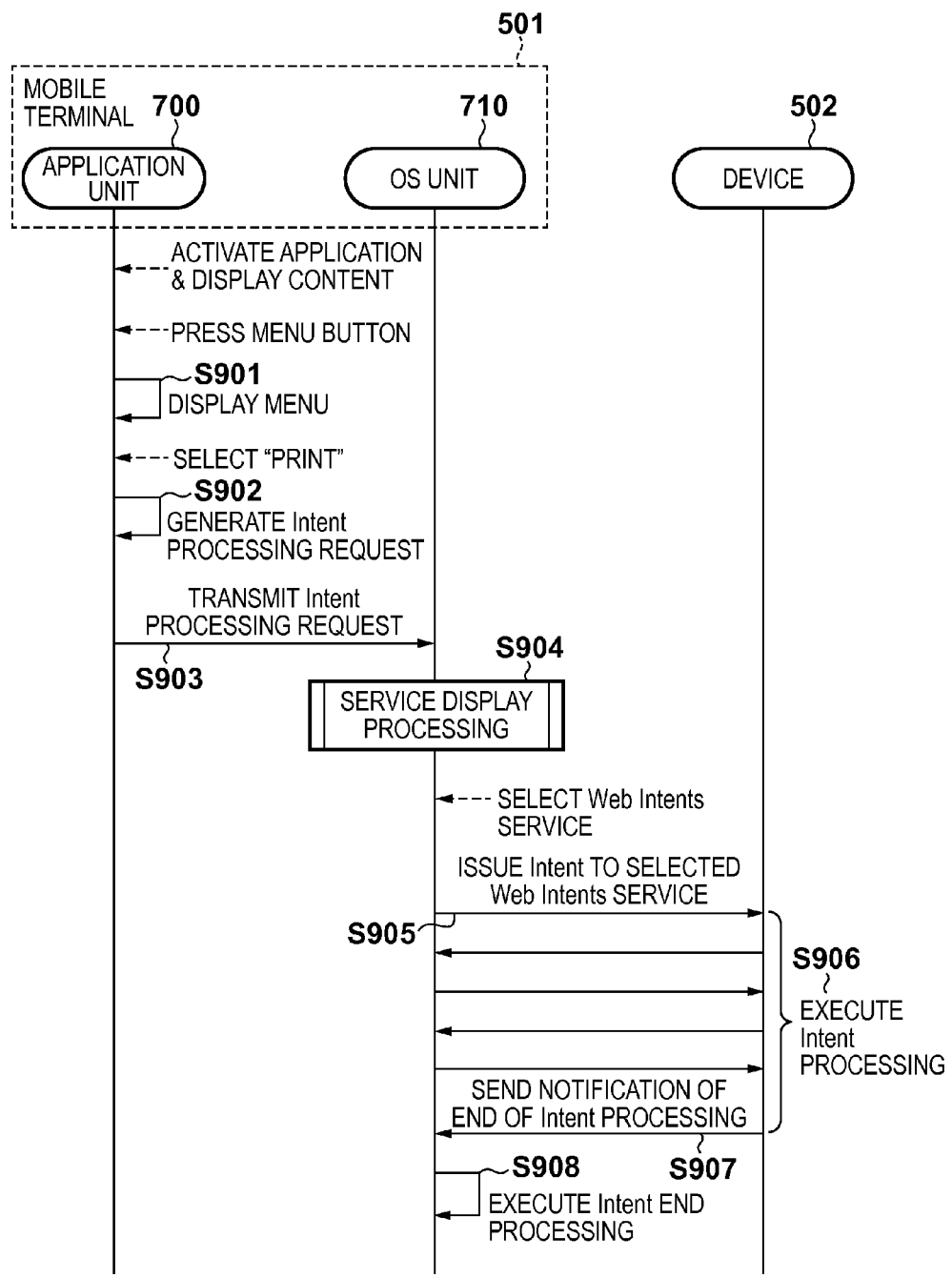

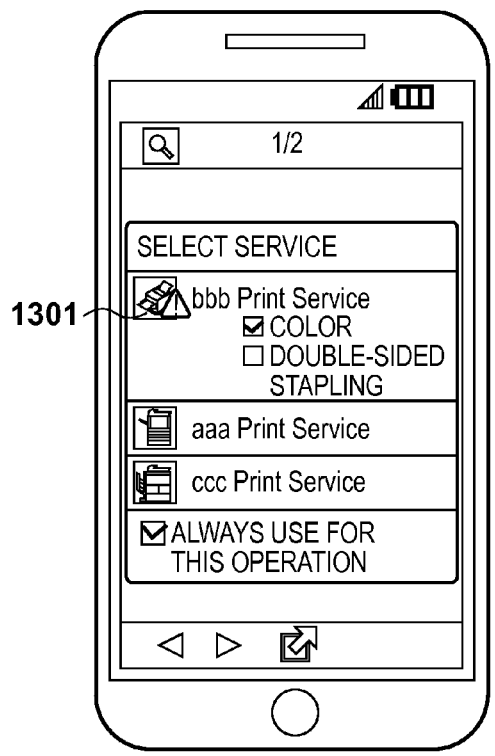 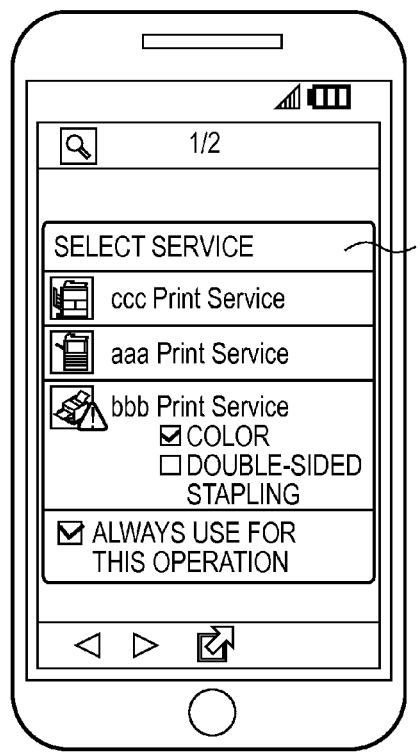
FIG. 13A  FIG. 13B
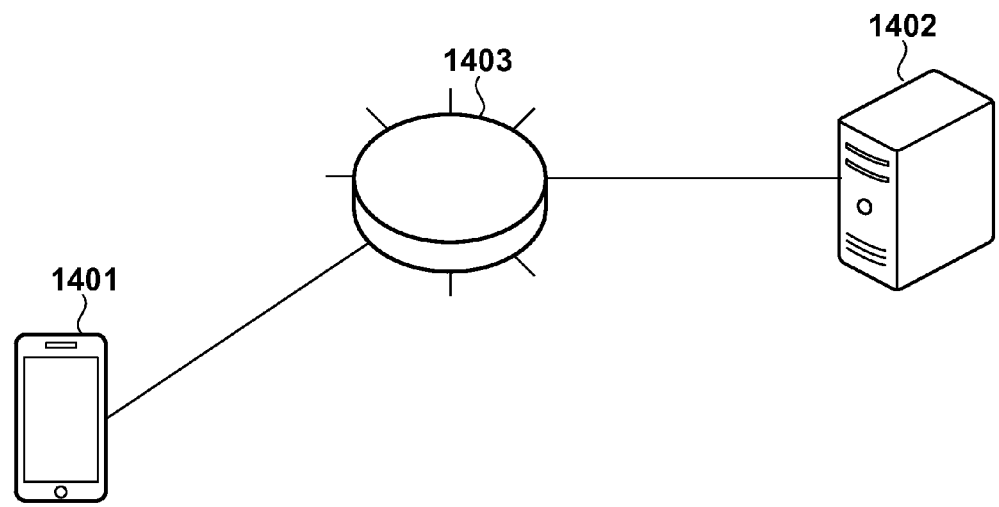
FIG. 14

| Service ID 1711 | action 1712 | type 1713 | href 1714 | title 1715 | disposition 1716 | account type 1717 |
|---|---|---|---|---|---|---|
| 1 | share | image/* | http://www/aaa_share.html | aaa Share Service | window | AAA |
| 2 | share | image/jpg | http://www/bbb_share.html | bbb Share Service | inline | BBB |
| 3 | pick | image/* | http://www/aaa_pick.html | aaa Pick Service | window | - |
| 4 | edit | image/* | http://www/bbb_edit.html | bbb Edit Service | window | BBB |
| 5 | share | image/* | http://www/ccc_share.html | ccc Share Service | window | CCC |

| User ID 1721 | password 1722 | status 1723 | account type 1724 |
|---|---|---|---|
| a | xxxxa | out | AAA |
| b | xxxxb | in | BBB |
| c | xxxxc | out | CCC |

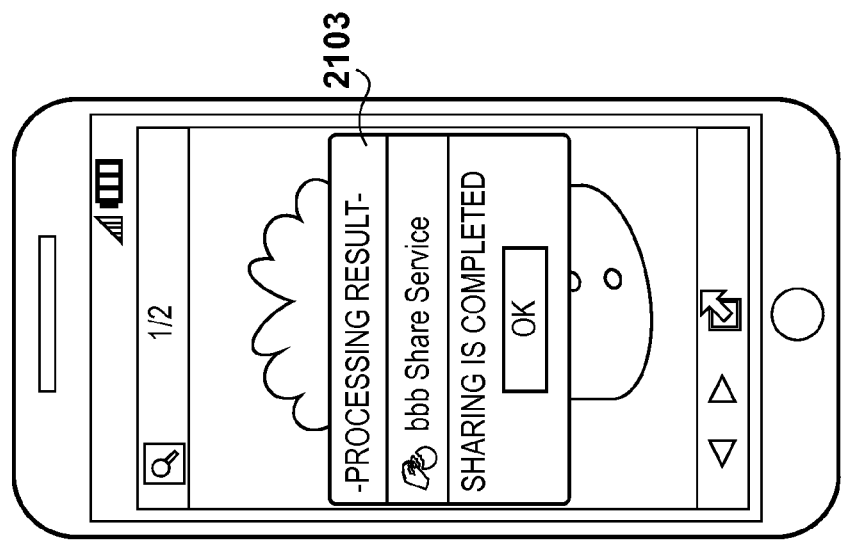
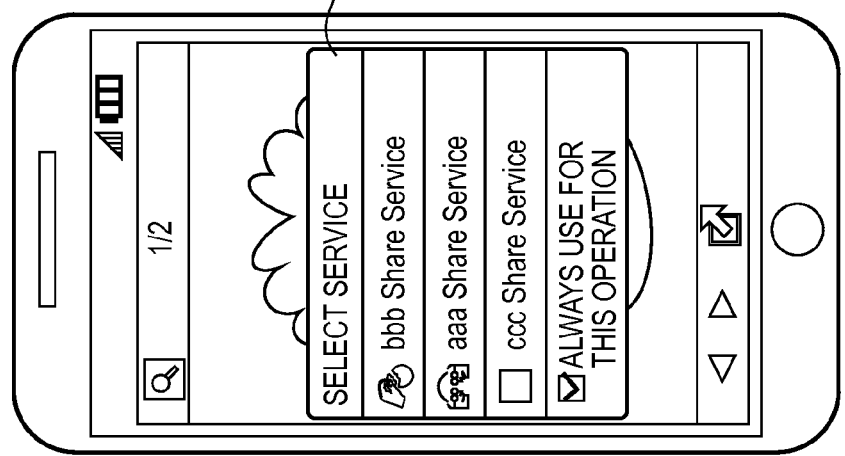
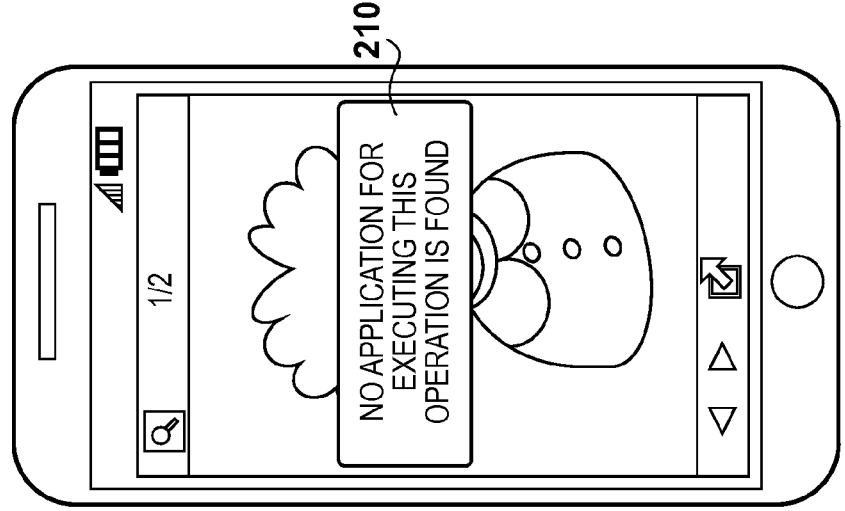

FIG. 22

| Service ID | action | type | href | title | disposition |
|---|---|---|---|---|---|
| 1 | edit | image/* | http://www/aaa_edit.html | aaa Edit Service | window |
| 2 | edit | image/* | http://localhost/bbb_edit.html | bbb Edit Service | window |
| 3 | pick | image/* | http://www/aaa_pick.html | aaa Pick Service | window |
| 4 | edit | image/* | http://www/ccc_edit.html | ccc Edit Service | window |
| 5 | share | image/* | http://www/ccc_share.html | ccc Share Service | window |

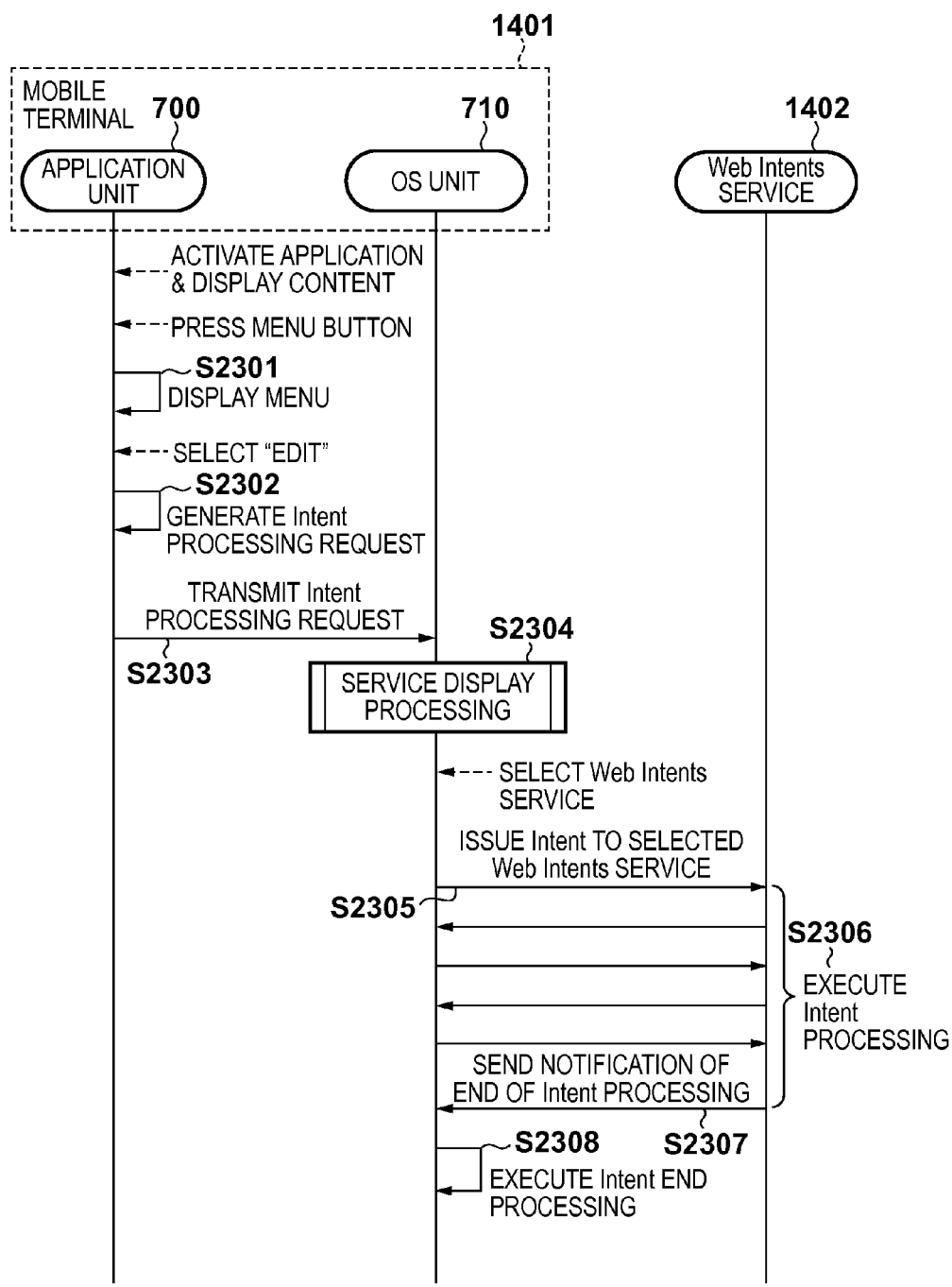

INFORMATION PROCESSING TERMINAL, CONTROL METHOD THEREFOR, AND NON-TRANSITORY COMPUTER-READABLE MEDIUM

BACKGROUND OF THE INVENTION

Field of the Invention

The present invention relates to an information processing terminal, a control method therefor, and a non-transitory computer-readable medium and, more particularly, to a technique of providing a service using a mechanism such as Web Intents.

Description of the Related Art

Conventionally, when transferring processing between Web sites, a function calling side needs to know the API (Application Programming Interface) of a function providing side, and a method of calling a function such as a REST (Representational State Transfer) interface. To implement cooperation with a different Web site, therefore, the function calling side needs to perform processing on the calling side according to calling protocols. In order for the function calling side to use the function, authentication on the function providing side is often required. Therefore, the function using side needs to hold authentication information of the function providing side, and use authentication infrastructure such as SAML (Security Assertion Markup Language). Note that if authentication information is held, it is required to correctly, securely manage the authentication information. Furthermore, to use the authentication infrastructure such as SAML, it is necessary to have an agreement in advance between the provider and user of the function, thereby imposing a load on the user of the function.

There is also a mechanism of cooperating with an arbitrary Web service (or Web application) without using a dedicated API. As an example, there has been proposed a mechanism called Web Intents for implementing cooperation between the user and provider of a service by loosely coupling them by late run-time binding.

As a conventional technique, there is provided a technique described in Japanese Patent-Laid Open No. 2013-12110. In this technique, a cooperation destination application selected by the user returns data that cannot be processed to a cooperation source application, thereby counting the number of errors. A cooperation destination application for which the number of errors exceeds a threshold is not displayed at the time of cooperation.

However, Japanese Patent Laid-Open No. 2013-12110 is not directed to inter-Web service cooperation using a mechanism such as Web Intents. Regardless of Web services, in the current inter-service cooperation mechanism, the display order or display positions of selection target services displayed to the user are not always user-friendly.

According to the present invention, it is possible to provide a user-friendly service display method under specific conditions when using an inter-service cooperation mechanism including Web services.

SUMMARY OF THE INVENTION

According to one aspect of the present invention, there is provided an information processing terminal having a relay function of relaying, via a network, a client for managing data and a service for providing a function using the data managed by the client, comprising: a receiving unit configured to, upon receiving function information for calling the function provided by the service by the relay function, receive reference information pertaining to providing of the function information; a register unit configured to execute registration processing of the received function information; and a providing unit configured to provide a user with the function information registered by the registration processing according to at least one of a display order and a display position based on the reference information.

According to another aspect of the present invention, there is provided a control method for an information processing terminal having a relay function of relaying, via a network, a client for managing data and a service for providing a function using the data managed by the client, comprising: upon receiving function information for calling the function provided by the service by the relay function, receiving reference information pertaining to providing of the function information; executing registration processing of the received function information; and providing a user with the function information registered by the registration processing according to at least one of a display order and a display position based on the reference information.

According to another aspect of the present invention, there is provided a non-transitory computer-readable medium storing a program for causing a computer, having a relay function of relaying, via a network, a client for managing data and a service for providing a function using the data managed by the client, to function as a receiving unit configured to, upon receiving function information for calling the function provided by the service by the relay function, receive reference information pertaining to providing of the function information, a register unit configured to execute registration processing of the received function information, and a providing unit configured to provide a user with the function information registered by the registration processing according to at least one of a display order and a display position based on the reference information.

According to the present invention, it is possible to improve the usability in an inter-service cooperation mechanism such as Web Intents.

Further features of the present invention will become apparent from the following description of exemplary embodiments (with reference to the attached drawings).

BRIEF DESCRIPTION OF THE DRAWINGS

FIG. 1 is a view showing the overall arrangement of Web Intents;

FIG. 2 is a sequence chart showing the basic operation of Web Intents;

FIG. 3 is a view showing an example of registration markup held by a Web Intents service;

FIG. 4 is a view showing an example of an Intent processing request generated by a Web Intents client;

FIG. 5 is a view showing a system configuration according to the first embodiment;

FIGS. 8A, 8B, 8C, and 8D are views showing tables held by the mobile terminal and an example of a response according to the first embodiment;

FIG. 9 is a sequence chart when the mobile terminal issues Intents to the device according to the first embodiment;

FIGS. 13A and 13B are views each showing an example of the screen of the OS unit of the mobile terminal according to the first embodiment;

FIG. 14 is a view showing a system configuration according to the second embodiment;

FIGS. 17A and 17B are tables each showing a table held by a mobile terminal according to the second embodiment;

FIGS. 21A, 21B, and 21C are views each showing an example of the screen of the OS unit of the mobile terminal according to the second embodiment;

FIG. 22 is a table showing a table held by a mobile terminal according to the third embodiment;

FIG. 23 is a sequence chart when the mobile terminal issues Intents to a Web Intents service according to the third embodiment;

DESCRIPTION OF THE EMBODIMENTS

First Embodiment

Figure 6A:
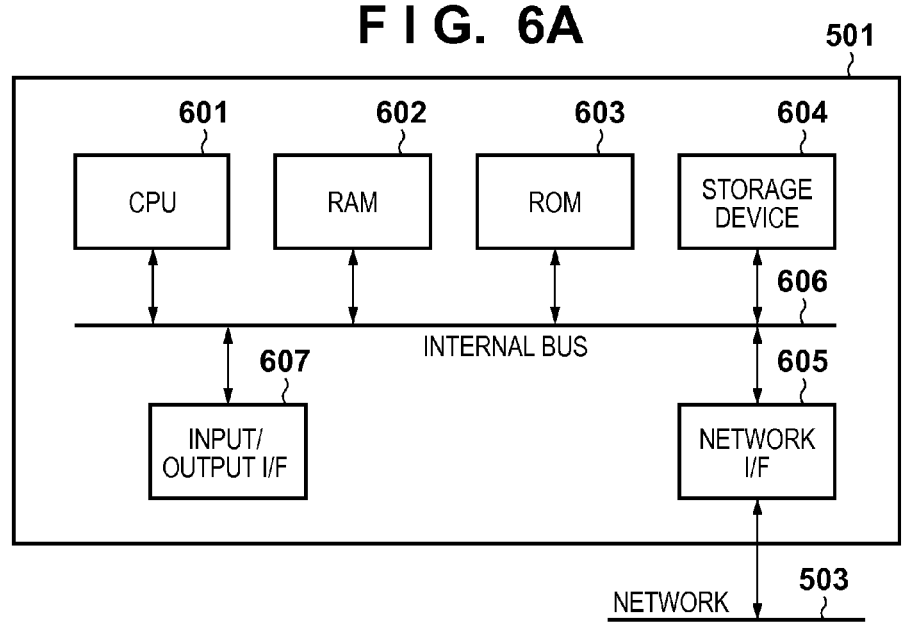
FIGS. 6A and 6B are block diagrams respectively showing the hardware arrangements of a mobile terminal and device according to the first embodiment.

An embodiment of the present invention will be described below with reference to the accompanying drawings.

[Overview of Web Intents Mechanism]

A basic mechanism related to Web Intents as an example of a mechanism of cooperating with an arbitrary Web service (or Web application) without using a dedicated API will first be explained with reference to the accompanying drawings. Note that Web Intents will be described as a practical example in the present invention. It is, however, possible to apply another similar mechanism as a technique of service cooperation including an arbitrary Web service (or Web application).

FIG. 1 is a view showing the overall arrangement of Web Intents. A Web Intents service 103 provides a service or function using the Intents technique. A Web Intents client 101 uses the service provided by the Web Intents service 103. A UA (User Agent) 102 transfers a request from the Web Intents client 101 to the Web Intents service 103. The UA 102 functions to transfer a result from the Web Intents service 103 to the Web Intents client 101. For this function, the UA 102 has a relay function of exchanging various data between the Web Intents client 101 and the Web Intents service 103.

By comparing social buttons such as "like", "check", and "share" on an SNS (Social Networking Service) site to the Web Intents mechanism, the Web Intents client 101 corresponds to the site on which the buttons are arranged. The UA 102 corresponds to a Web browser (to be referred to as a browser hereinafter), and the Web Intents service 103 corresponds to a submission destination service such as "like". If user authentication or a user operation is necessary for the Web Intents service 103 to provide the function, the user performs an operation on the UA 102.

Note that if the UA 102 has a function of cooperating with a service (to be described later), it can be implemented by an operating system (OS) or an application operating on an information processing terminal, instead of the browser. Examples of the information processing terminal are a personal computer (PC), smartphone, tablet device, and car navigation device.

Examples of the Web Intents service 103 are a camera incorporated in an information processing terminal, and an application installed in the information processing terminal, in addition to a service provider on the Internet, such as the above-described submission destination service. Furthermore, peripheral devices such as a printer, scanner, and network camera connected via a network, home appliances such as a refrigerator and television set, and the like can serve as service providers.

[Basic Sequence]

FIG. 2 is a sequence chart for explaining a basic operation associated with providing of a service using Web Intents. In S201, as processing of registering the Web Intents service 103, the UA 102 accesses the Web Intents service 103 in response to a user operation. In S202, the Web Intents service 103 creates an HTML response containing registration markup for registering a service provided by itself in the UA 102, and returns the HTML response to the UA 102.

Contents of the HTML response returned from the Web Intents service 103 to the UA 102 will be described with reference to an example shown in FIG. 3. In an intent tag, information for specifying a service is described. An action attribute indicates a function provided by the service (the category of the provision function), and a type attribute indicates the type of data processable for the action attribute (provision function). An href attribute indicates a URL (Uniform Resource Locator) as the connection destination of the service, and a title attribute indicates the title of the service. Furthermore, a disposition attribute indicates how the service is displayed. The respective attributes and their values in the intent tag are commonly defined by, for example, the Web Intents specifications. For example, for the action attribute, values such as "edit", "share", "pick", "view", "subscribe", and "save" are defined as specification information.

In the example shown in FIG. 3, it is indicated that the Web Intents service 103 can "share (sharing)" image data in any format. The connection destination at this time is "share.html", and the title is "Share image using e-mail". The connection destination of the service indicates that the service is displayed by another window ("window").

Upon receiving the HTML response from the Web Intents service 103, the UA 102 confirms with the user whether to register the Web Intents service 103 in the UA 102. If, for example, the UA 102 is a browser, a popup window is displayed to prompt the user to make a selection. If the user selects to register the Web Intents service, the UA 102 stores it in itself.

In S203, the UA 102 accesses the Web Intents client 101 in response to a user operation. In S204, the Web Intents client 101 creates an HTML response in which information indicating that the Web Intents service 103 is to be used is described, and returns the HTML response to the UA 102. If, for example, an image and a "share" button (not shown) are displayed on a given Web site as the Web Intents client 101, the Web site returns an HTML response containing an ECMAScript shown in FIG. 4 to the UA 102.

Contents of the HTML response returned from the Web Intents client 101 to the UA 102 will be explained with reference to an example shown in FIG. 4. The ECMAScript shown in FIG. 4 indicates that a designated unnamed function (function( ) is executed when a button (not shown) assigned with an ID "share-photo" in the HTML response is clicked ("click"). The unnamed function creates a new Intent object, and calls a function startActivity( ) by setting the generated Intent object as an argument. Upon executing the function, the UA 102 extracts ones of the Web Intents services 103 registered in itself, whose action and type attribute values match those of the designated Intent object, and displays a list of the extracted Web Intents services, thereby requesting the user to make a selection. By executing a function getImageFrom( ) called in the unnamed function, image data held in the Web Intents client 101 are obtained.

In S205, the UA 102 receives the HTML response from the Web Intents client 101, and displays it. In S206, when the user presses the "share" button (not shown) on the screen, the UA 102 executes the ECMAScript (FIG. 4) for activation of Web Intents, and obtains the image data held in the Web Intents client 101, as described above. Upon pressing of the "share" button, the list of the Web Intents services 103 registered in the UA 102 is displayed.

When the user selects a Web Intents service 103 from the list, in S207 the UA 102 transmits a request to the selected Web Intents service 103. At this time, the UA 102 includes contents of the Intent object created by the ECMAScript of FIG. 4 in transmission data. In S208, the Web Intents service 103 extracts the Intent object from the request, and implements the use of the selected service (in this example, "share" of the image) while interacting with the user via the UA 102.

When, for example, the user accesses a Web site where an image and a share button are provided, and presses the share button, a service list is displayed on a popup window. If the user selects a Web mail service, a new mail attached with the image data is created, and the user can transmit the email.

Upon completion of the processing, in S209 the Web Intents service 103 generates a response containing an ECMAScript for notifying the Web Intents client 101 of a processing result, and returns the response to the UA 102. In S210, the UA 102 executes the ECMAScript contained in the response, and calls a callback function onSuccess( ) designated by an argument of the function startActivity( ) in S205. In S211, the UA 102 returns the processing result to the Web Intents client 101 using the callback function onSuccess( ).

The above processing sequence enables the Web Intents client 101 to call, via the UA 102, the function or service (in this example, "share" of an image) of Web Intents provided by the Web Intents service 103.

[System Configuration]

FIG. 5 is a view showing the relationship between the Web Intents client 101, the UA 102, and the Web Intents service 103 which are connected via the Internet according to this embodiment. Referring to FIG. 5, a mobile terminal 501 serving as an information processing terminal is a mobile terminal including the above-described Web Intents client 101 and UA 102. Although the Web Intents client 101 has been explained as a general Web site, a local application installed in the mobile terminal 501 also corresponds to the Web Intents client 101. For example, a content display/edit application, SNS application, storage application, mail application, or the like corresponds to the Web Intents client 101. Furthermore, although the UA 102 has been explained as a browser on the PC, a browser or OS portion in the mobile terminal 501 also corresponds to the UA 102. In this embodiment, assume that the Web Intents client 101 corresponds to an application portion in the mobile terminal 501, and the UA 102 corresponds to the OS portion.

A device 502 corresponds to the above-described Web Intents service 103. This embodiment assumes an image forming apparatus for providing a function/service of, for example, printing and saving a target document. The mobile terminal 501 and the device 502 are interconnected via a network 503.

Note that although this embodiment assumes that a protocol such as HTTP or HTTPS is used as a communication protocol, the present invention is not limited to this. For example, in an example shown in FIG. 5, the mobile terminal 501 and the device 502 transmit/receive data using HTTPS. A connection form in a communication environment using the network 503 may be wired or wireless connection. Only the one mobile terminal 501 and the one device 502 are shown in FIG. 5. The present invention, however, is not limited to this, and a plurality of apparatuses may be included.

[Hardware Arrangement]

FIG. 6A is a block diagram showing the hardware arrangement of the mobile terminal 501 according to this embodiment. A ROM 603 is an internal storage device, and stores an OS, an application for controlling a call or data communication, and data such as various operation mode settings which need to be held even after reactivation of the mobile terminal 501. The ROM 603 also stores terminal information such as specifications and development vendor information of the mobile terminal 501.

The mobile terminal 501 includes a CPU 601 for executing programs such as the above-described application and OS, and comprehensively controls respective control units via an internal bus 606. A RAM 602 serves as a memory area for executing a program, and also temporarily stores Web page data obtained by the browser from a Web server, authentication information for accessing a Web service, and the like. A storage device 604 is a detachable nonvolatile external storage device, and can save various data stored in the ROM 613 in addition to an operation log and content (photos, moving images, documents, and the like).

A network I/F 605 performs communication control of a wireless LAN communication unit for joining a wireless LAN and a mobile phone data communication unit for joining the network 503 provided by a communication carrier. The CPU 601, the RAM 602, the ROM 603, the storage device 604, the network I/F 605, and an input/output I/F 607 are connected to the internal bus 606. The input/output I/F 607 is an I/F for inputting/outputting audio data using, for example, a microphone/loudspeaker, display, or touch panel, and controlling an instruction from a user. This allows the user to issue, to the mobile terminal 501, an instruction such as an instruction to control the mobile terminal by a voice, an instruction to make a call, and an instruction to activate each application.

Figure 6B:
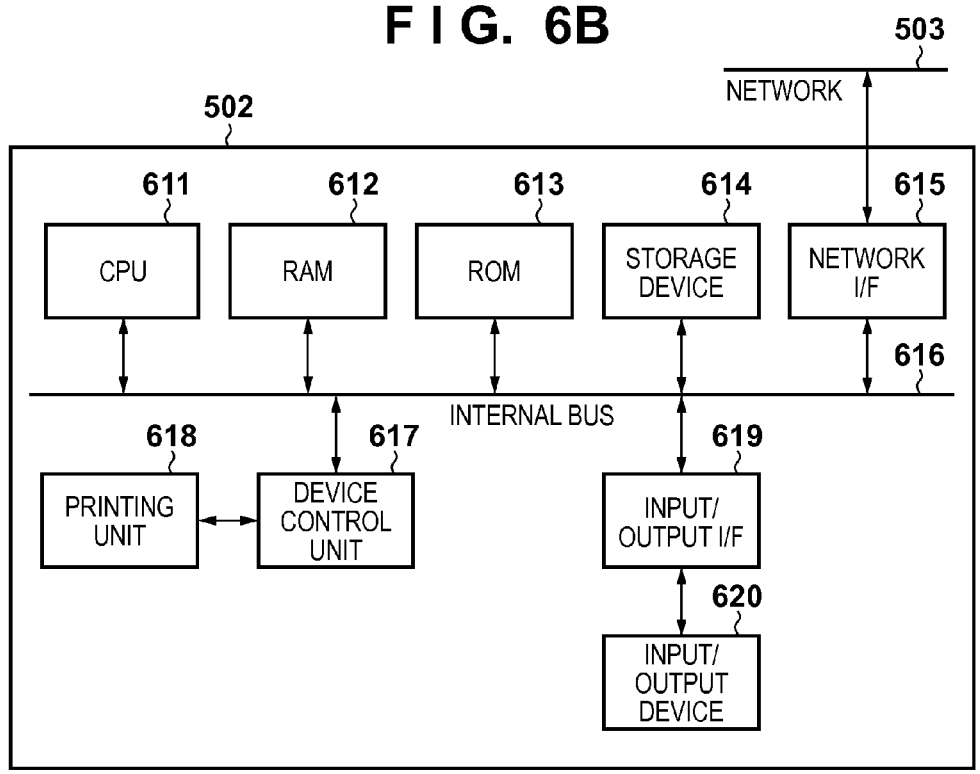

FIG. 6B is a block diagram showing the hardware arrangement of the device 502 according to this embodiment. The device 502 is applicable to, for example, an image forming apparatus such as a digital multifunctional peripheral, facsimile apparatus, laser beam printer, inkjet printer, and scanner apparatus. The device 502 includes a CPU 611, a RAM 612, a ROM 613, a storage device 614, a network I/F 615, an internal bus 616, a device control unit 617, and a printing unit 618 with a fixing unit and the like.

The CPU 611 comprehensively controls respective devices via the internal bus 616 by executing programs stored in the ROM 613. The ROM 613 also stores destination information (region) indicating a region to which the device 502 is shipped. A language to be displayed on an input/output device 620 is decided according to the destination information. The RAM 612 functions as a memory or work area for the CPU 611. The network I/F 615 unidirectionally or bidirectionally exchanges data with an external network device or personal computer (PC) via the network 503, and the device control unit 617 controls the printing unit 618.

The CPU 611 performs processing of executing a program using the RAM 612 and ROM 613, and also performs processing of recording image data in a recording medium such as the storage device 614. The storage device 614 functions as an external storage device, and stores image data and the like. In addition, instead of the RAM 612, the storage device 614 can save the above-described counter information, system information, and monitoring information. The input/output device 620 accepts an input (scan or button input) from the user, and notifies each processing unit of it via an input/output I/F 619.

[Software Arrangement]

Figure 7A:
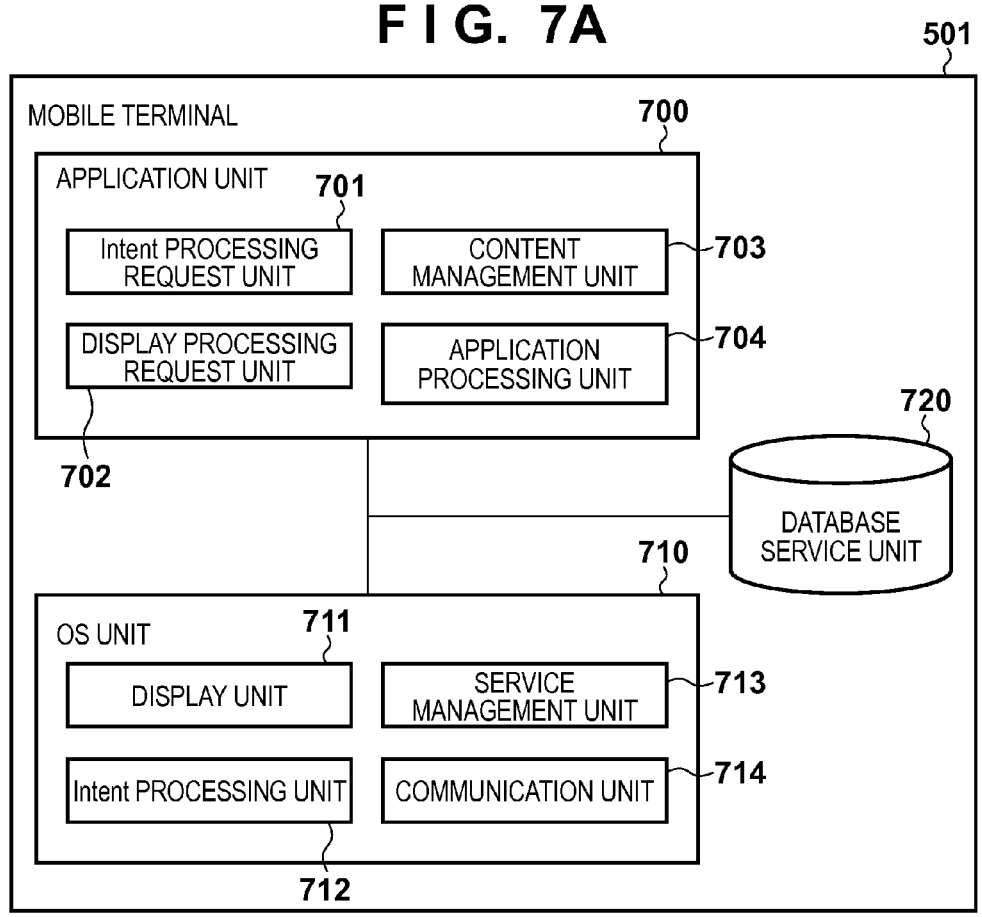
FIGS. 7A and 7B are block diagrams respectively showing the software arrangements of the mobile terminal and device according to the first embodiment.

FIG. 7A is a block diagram showing an example of the software arrangement of the mobile terminal 501. In the mobile terminal 501, an application unit 700 and respective processing units exist as files saved in the storage device 604 of the mobile terminal 501 or the like. These files are program modules which are loaded into the RAM 602 by the OS or another processing unit at the time of execution, and then executed.

The application unit 700 is a software module group for controlling, for example, a content display/edit application, SNS application, storage application, and mail application. The application unit 700 includes an Intent processing request unit 701, a display processing request unit 702, a content management unit 703, and an application processing unit 704. The Intent processing request unit 701 generates an Intent processing request for the OS unit 710. The display processing request unit 702 requests, of an OS unit 710, an application display method and a method of displaying a target content on the screen of the mobile terminal 501. The content management unit 703 obtains and stores a content from and in the storage device 604 via a database service unit 720, as needed. The application processing unit 704 executes the processes of various applications.

The OS unit 710 is a general operating system such as Windows®, Android, iOS, or Tizen. A display unit 711 receives the display method requested by the display processing request unit 702, and displays data according to the contents of the requested display method. An Intent processing unit 712 receives the Intent processing request from the Intent processing request unit 701, and issues a processing request to another processing unit according to the contents of the Intent processing request. The Intent processing unit 712 requests the Web Intents service 103 selected by the user to perform Intent processing. A service management unit 713 obtains and stores information from and in a table for managing the registered Web Intents services 103 in the storage device 604 via the database service unit 720. In response to a request from another processing unit, a communication unit 714 performs communication control via the network I/F 605. In response to a request from another processing unit, the database service unit 720 stores and reads out a content in and from the storage device 604 or the like.

Figure 7B:
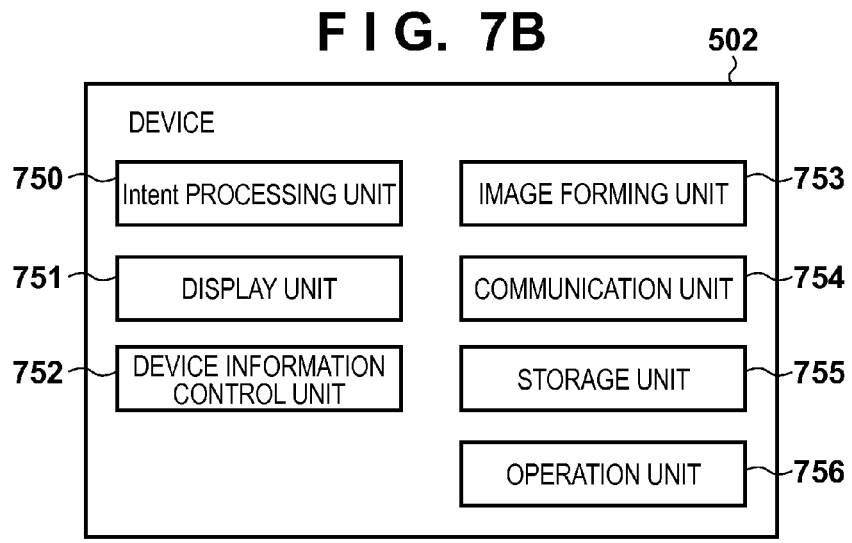

FIG. 7B is a block diagram showing an example of the software (processing unit) arrangement of the device 502. The device 502 includes an Intent processing unit 750, a display unit 751, a device information control unit 752, an image forming unit 753, a communication unit 754, a storage unit 755, and an operation unit 756. The Intent processing unit 750 analyzes the Intent object sent from the mobile terminal 501, and instructs another processing unit to perform processing in response to a request. The display unit 751 displays the state information, setting information, and the like of the device 502 to the user. While controlling printing of the device 502 and managing abnormal states, the device information control unit 752 manages counter information and notification information. The device information control unit 752 also performs control operations associated with tint adjustment, a print mode, and other function settings.

The image forming unit 753 has a function of generating and outputting print data. The communication unit 754 is connected to the network 503, and used for mutual communication between the device 502 and another information device on the network 503. The storage unit 755 exchanges information with the storage areas of the RAM 612, ROM 613, and storage device 614. The storage unit 755 also stores the operation history of the device 502, data representing various abnormal states, and the like. The operation unit 756 allows the user to issue an operation instruction represented by a print instruction to the device 502 via the input/output I/F 619 and the input/output device 620.

[Table Structure]

FIG. 8A shows an example of a terminal information table held to manage the terminal information of the mobile terminal 501. For example, a terminal information table 800 is held in the ROM 603 of the mobile terminal 501, and controlled by the database service unit 720. An "item" 801 is information indicating each term of the terminal information. The terminal information includes, for example, a model name, OS version, serial number, and vendor name. A "value" 802 indicates the value of each term of the terminal information.

FIG. 8B shows an example of a registered Web Intents service table held for the OS unit 710 of the mobile terminal 501 to manage the Web Intents services 103 registered in the mobile terminal by registration processing. A registered Web Intents service table 810 is held in the storage device 604 of the mobile terminal 501, and controlled by the database service unit 720. A "Service ID" 811 indicates an ID (identification information) used by the service management unit 713 of the OS unit 710 to uniquely identify the Web Intents service 103. An "action" 812 is information indicating a function or service provided by the Web Intents service 103.

A "type" 813 is information indicating a data format processable for the "action" 812. An "href" 814 indicates the relative URL of the Web Intents service 103. A "title" 815 indicates the title of the Web Intents service 103. A "disposition" 816 indicates how the Web Intents service 103 is displayed. That is, the OS unit 710 can issue an Intent processing request to the Web Intents service 103 by referring to the registered Web Intents service table 810 via the service management unit 713.

A "vendor" 817 indicates the development vendor of the Web Intents service 103. An "extend" 818 indicates detailed information about the Web Intents service 103. The "vendor" 817 and "extend" 818 are pieces of information provided by the Web Intents service 103 when the UA 102 registers the Web Intents service 103.

FIG. 8C shows an example of an HTML response transmitted from the Web Intents service 103 when the UA 102 registers the Web Intents service 103. This corresponds to the information transmitted in S202 of FIG. 2. Note that a case has been explained in which when the mobile terminal 501 registers the device 502 as the Web Intents service 103, vendor information and detailed information are obtained as parameters of the vendor attribute and extend attribute described in the intent tag. However, a method of obtaining these pieces of information is not limited to this. For example, the vendor information and detailed information may be included as part of information included in the tag, such as the existing title attribute and href attribute, without extending the existing intent tag shown in FIG. 3. It is also possible to include the vendor information and detailed information in a portion other than a portion where the intent tag is described, for example, an HTTP header portion at the time of obtaining the intent tag. In a different session at the time of registration of the Web Intents service 103, or in communication at a different timing before or after registration, the vendor information and detailed information may be obtained as related information of the Web Intents service 103. When the Web Intents service 103 is registered, various kinds of information obtained as an HTML response are managed in the registered Web Intents service table 810 shown in FIG. 8B.

FIG. 8D shows an example of a detailed information table held for the OS unit 710 of the mobile terminal 501 to analyze the "extend" 818 about the Web Intents service 103. A detailed information table 820 is held in the storage device 604 of the mobile terminal 501, and controlled by the database service unit 720. An "extend" 821 indicates detailed information about the Web Intents service 103, and corresponds to a value set in the "extend" 818 of the registered Web Intents service table 810. A "function" 822 indicates the meaning of the value of the "extend" 821.

The OS unit 710 confirms that the development vendor of the mobile terminal 501 is the same as that of the Web Intents service 103 by referring to the terminal information table 800 and the detailed information table 820. If it is determined that the vendors coincide with each other, the OS unit 710 can analyze the detailed information of the Web Intents service 103. In this embodiment, for example, it is indicated that a print service "bbb Print Service" whose "Service ID" 811 is "3" can provide color printing ("cl"), double-sided printing ("duplex"), and stapling ("staple") functions.

The value of the "extend" 818 set as detailed information is different depending on the development vendor. However, if the development vendor of the mobile terminal 501 coincides with the providing source of the Web Intents service as in this embodiment, the mobile terminal 501 side can grasp contents (for example, providable function information) of the "extend" 818.

[Processing Request Issuance Sequence]

FIG. 9 is a sequence chart when the mobile terminal 501 issues an Intents processing request to the device 502. In this embodiment, processing of displaying a content using an application in the mobile terminal 501, and requesting the device 502 to perform printing will be described. The processing will be explained from a point where the application unit 700 processes the content when the Web Intents service 103 has already been registered in the mobile terminal 501.

Figure 10A:
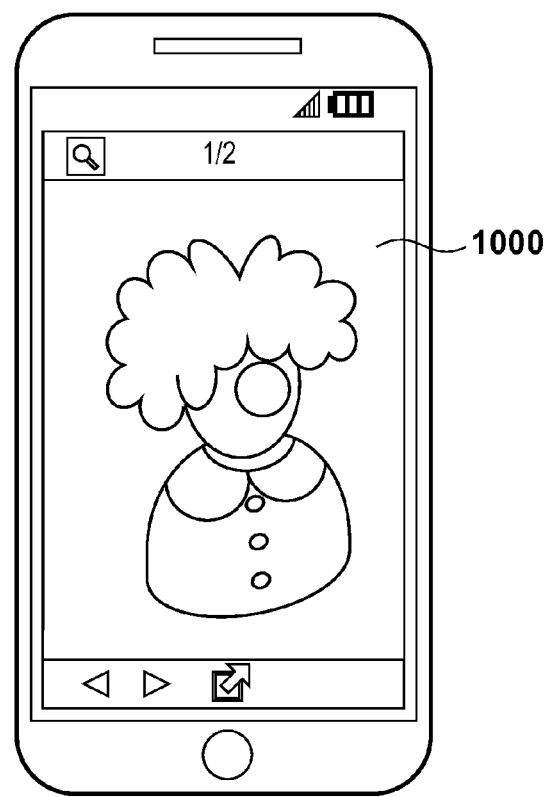
FIGS. 10A and 10B are views each showing an example of the screen of the mobile terminal according to the first embodiment.

An application is activated by a user operation, and a target content is displayed. After that, the menu button (not shown) of the application is pressed by a user operation. FIG. 10A shows a state in which a content 1000 is displayed by the application unit 700 of the mobile terminal 501.

Figure 10B:
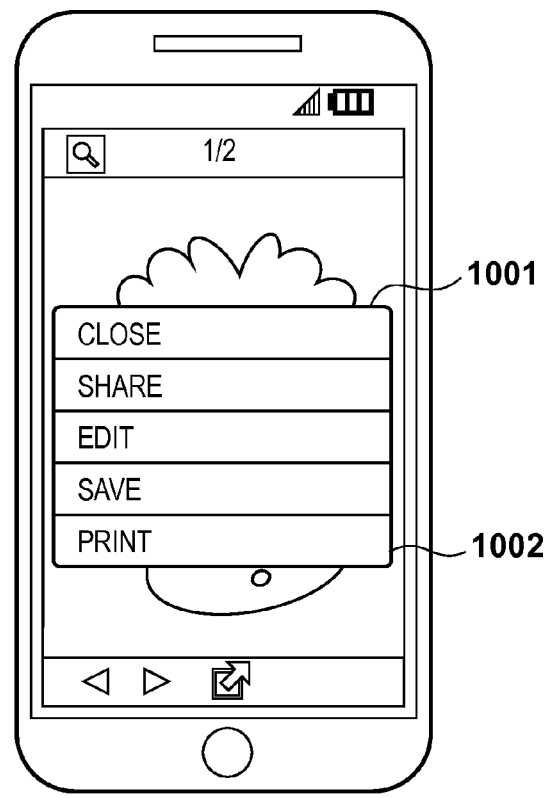

In S901, the application unit 700 detects pressing of the menu button, and displays a menu. FIG. 10B shows a state in which a menu 1001 is displayed after the menu button is pressed. After that, when the user selects a "print" button 1002, the application unit 700 generates an Intent processing request in S902. The generated Intent processing request contains the type of the target content, a path, and the action of the selected menu. Since this embodiment assumes that a target image is to be printed, "image/*" is designated as the type, and "print" is designated as the action. The symbol "*" indicates an arbitrary character. In S903, the application unit 700 transmits the generated Intent processing request to the OS unit 710. This processing corresponds to S204 of FIG. 2 and FIG. 4. Upon receiving the Intent processing request from the application unit 700, the OS unit 710 performs service display processing in S904.

Figure 11:
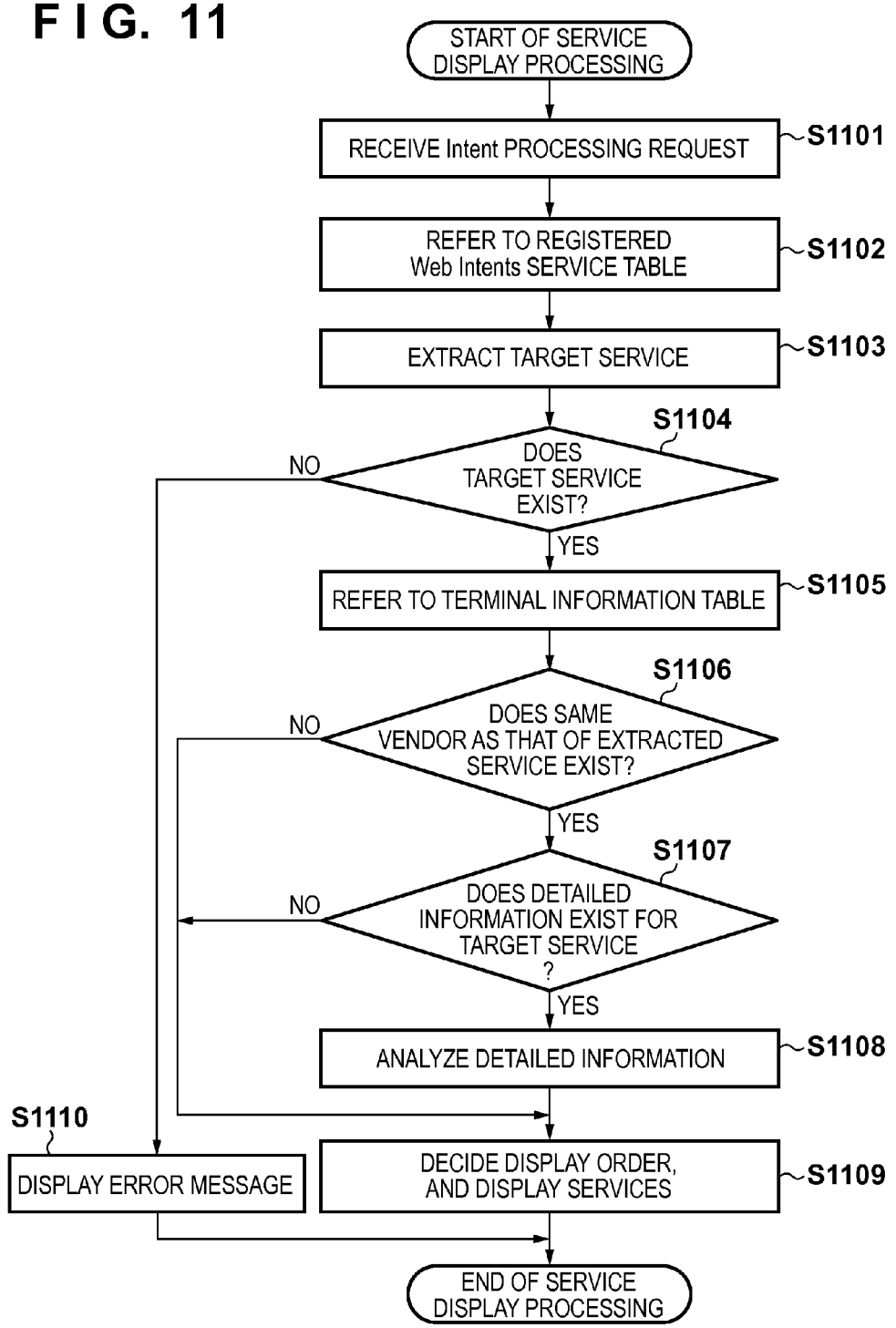
FIG. 11 is a flowchart illustrating the service display processing of the OS unit of the mobile terminal according to the first embodiment.

The service display processing in S904 will be described in detail with reference to a flowchart shown in FIG. 11. In step S1101, the OS unit 710 receives the Intent processing request generated by the application unit 700. In step S1102, the OS unit 710 refers to the registered Web Intents service table 810. In step S1103, the OS unit 710 compares the contents of the registered Web Intents service table 810 with the contents of the request, and extracts a target Web Intents service 103. In this example, the Web Intents services 103 whose "type" is "image/*" and whose "action" is "print" are targets. In the example shown in FIG. 8B, more specifically, pieces of information about the Web Intents services 103 each of which has "1", "3", or "4" as the "Service ID" 811 are extracted.

Figure 12A:
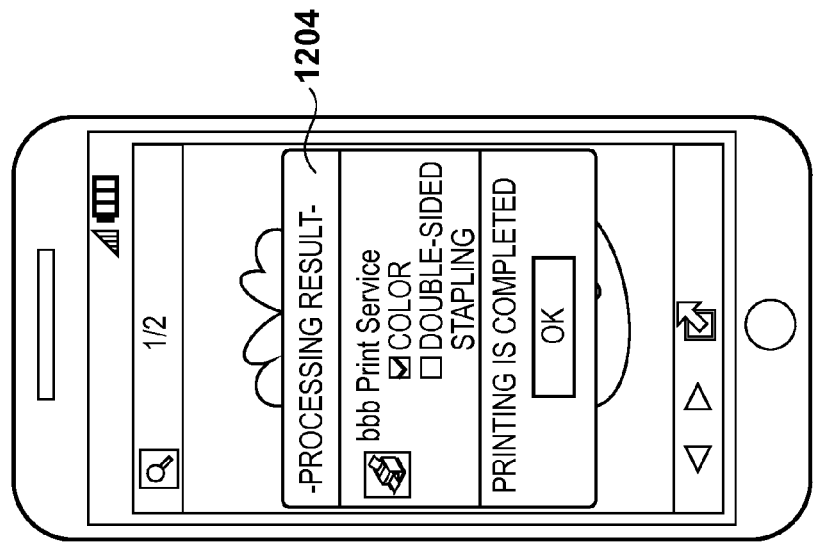
FIGS. 12A, 12B, and 12C are views each showing an example of the screen of the OS unit of the mobile terminal according to the first embodiment.

In step S1104, the OS unit 710 confirms whether a target service exists in the extraction processing in step S1103. If it is confirmed in step S1104 that no target service exists (NO in step S1104), in step S1110 the OS unit 710 displays an error message, and ends the service display processing. FIG. 12A shows an example of a message display screen 1201 in this case. On the other hand, if it is confirmed in step S1104 that a target service exists (YES in step S1104), in step S1105 the OS unit 710 confirms vendor information (the value of the "vendor") by referring to the terminal information table 800.

In step S1106, the OS unit 710 compares the "vendor" 817 of each of the Web Intents services 103 extracted in step S1103 with the vendor information of the mobile terminal 501 confirmed in step S1105. The OS unit 710 confirms whether the Web Intents service 103 whose vendor is the same as the development vendor of the mobile terminal 501 is registered and exists. In this example, the development vendor of the mobile terminal 501 is "BBB" with reference to the terminal information table 800. On the other hand, among the Web Intents services 103 extracted in step S1103, the Web Intents service 103 whose "vendor" 817 is "BBB" is the service "bbb Print Service" whose "Service ID" 811 is "3".

If it is confirmed in step S1106 that the target Web Intents service 103 exists (YES in step S1106), in step S1107 the OS unit 710 confirms whether information of the "extend" 818 exists for the target Web Intents service 103. If it is confirmed in step S1107 that detailed information exists for the target service (YES in step S1107), the OS unit 710 analyzes the detailed information of the "extend" 818 using the detailed information table 820 in step S1108.

In step S1109, the OS unit 710 decides the display order of the Web Intents services 103 extracted in step S1103 by setting, at a higher position, the Web Intents service 103 determined as a target in step S1105. A service for which detailed information exists may be arranged at a higher position. The higher position of the display order indicates that, for example, a service is arranged at a higher position where the user can recognize more easily when the extracted Web Intents services 103 are displayed in a list format. The OS unit 710 displays the services together with the detailed information analyzed in step S1108. If there are a plurality of Web Intents services 103 to be displayed at higher positions, the display order of the services is decided according to a given rule. The given rule is a general sort rule such as the alphabetical order or JIS code order. Assume that these rules are defined in advance, and managed by the OS unit 710.

If it is confirmed in step S1106 that no target Web Intents service 103 exists (NO in step S1106), in step S1109 the OS unit 710 decides the display order according to the given rule, and displays the services. If it is confirmed in step S1107 that no detailed information exists for the target Web Intents service 103 (NO in step S1107), in step S1109 the OS unit 710 decides the display order according to the given rule, and displays the services.

Figure 12B:
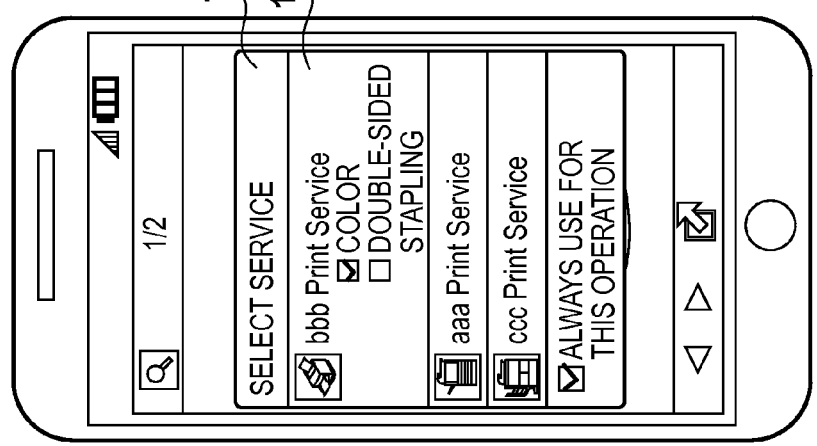

FIG. 12B shows a list 1202 of the Web Intents services 103 displayed at this time. There are three print services as the extracted Web Intents services 103, and the service "bbb Print Service" whose vendor is the same as the development vendor of the mobile terminal 501 and which has detailed information is displayed at the highest position of the list 1202. At this time, detailed information 1203 is displayed in the list 1202 so that the user recognizes that the device 502 has the color printing, double-sided printing, and stapling functions. Then, the processing sequence ends to return to the sequence of FIG. 9.

After that, when the user selects a given Web Intents service 103 from the list 1202 displayed by the OS unit 710, the OS unit 710 issues an Intent for the selected Web Intents service 103 in S905. In this embodiment, the OS unit 710 of the mobile terminal 501 requests the device 502 to perform processing. At this time, the OS unit 710 includes contents of the request and content transmitted by the application unit 700 in S903 in transmission data to the device 502.

In S906, the Intent processing unit 750 of the device 502 extracts an Intent object from the request issued in S905, and analyzes it, thereby starting Intent processing. In this embodiment, the Intent processing unit 750 of the device 502 provides a service of printing the content included in the Intent object while interacting with the user via the OS unit 710 of the mobile terminal 501. In S907, upon completion of the Intent processing, the device 502 notifies the OS unit 710 of a processing result.

Figure 12C:
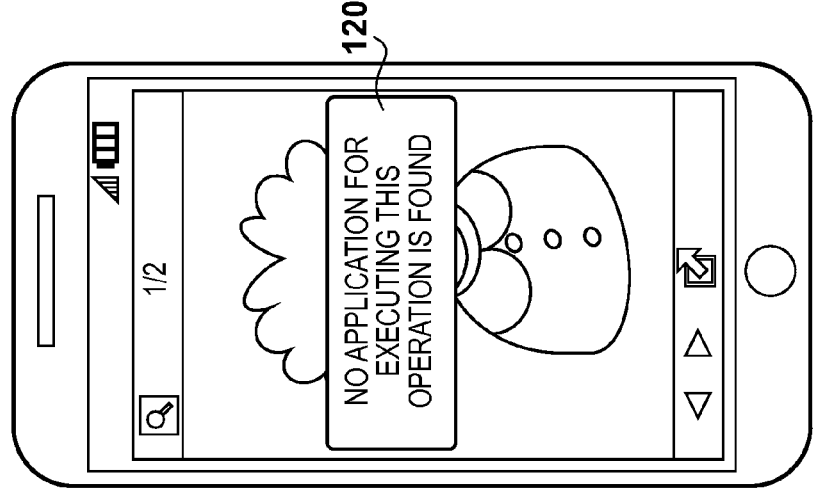

In S908, the OS unit 710 notifies the user of the result by, for example, displaying the Intent processing result notified from the device 502 on a screen. FIG. 12C shows an example of a result display screen 1204 for the processing result displayed by the OS unit 710.

In this embodiment, the display order, display contents, and positions of the services for which the development vendor information (the "vendor" 817) and detailed information (the "extend" 818) are displayed as reference information are decided. The present invention, however, is not limited to this. For example, in the service display processing in S904, it is also possible to decide the display order in consideration of the states of the Web Intents services 103. As in this embodiment, if the development vendor of the mobile terminal 501 is the same as that of the target Web Intents service 103, the mobile terminal 501 can obtain the state information of the Web Intents service 103.

Assume, for example, that the mobile terminal 501 obtains the state information of a given Web Intents service 103, and recognizes that the Web Intents service 103 does not function (due to a failure or the like). In this case, when displaying the list of the Web Intents services 103, the OS unit 710 may display the state information of the corresponding service (see an icon 1301 shown in FIG. 13A). The OS unit 710 may display state information, and display the service at the lower position of the list (see a list 1302 shown in FIG. 13B). If the development vendor information (the "vendor" 817 of the registered Web Intents service table 810) of the Web Intents service 103 is uncertain, the service need not be displayed in the list.

In this embodiment, the mechanism in which the OS unit 710 of the mobile terminal 501 decides the display order based on the pieces of vendor information and pieces of detailed information of the Web Intents services 103 has been explained. This mechanism enables the mobile terminal 501 to provide display of the Web Intents services 103 with high user convenience.

Furthermore, in this embodiment, the Web Intents client is included in the mobile terminal 501. As described above, however, the Web Intents client can be implemented by a general Web site. Similarly, although the UA has been explained as the OS portion of the mobile terminal, it may be replaced by a browser on the PC.

The present invention can also implement a method of providing a service with high user convenience by switching the display position method under specific conditions such as vendor information and detailed information, instead of the display order. More specifically, it is possible to switch positions by enlarging and displaying the selection region of the specific Web Intents service 103, or displaying the specific Web Intents service 103 in a layer relatively higher than other Web Intents services 103 on the screen. Note that in embodiments to be described below, it is possible to switch such display position method in consideration of the user convenience, instead of the display order.

In this embodiment, the arrangements of the respective servers and apparatuses, the software module arrangements, and the processing sequence that simultaneously uses a plurality of services have been explained but are merely examples. The present invention is not limited to them.

Second Embodiment

In the second embodiment, a method of deciding the display order of Web Intents services 103 depending on the login state of each Web Intents service account in a mobile terminal will be described.

[System Configuration]

FIG. 14 is a view showing the relationship between a Web Intents client 101, a UA 102, and the Web Intents service 103 which are connected via the Internet according to this embodiment. In FIG. 14, a mobile terminal 1401 includes the Web Intents client 101 and UA 102 as in the first embodiment. In this embodiment as well, assume that the Web Intents client 101 corresponds to an application portion of the mobile terminal 1401, and the UA 102 corresponds to an OS portion. A Web Intents service 1402 corresponds to the above-described Web Intents service 103. In this example, the Web Intents service 1402 is a general-purpose computer representing a Web site (Web application) for providing a function or a service of, for example, editing or saving an image or submitting an image to an SNS. A network 1403 is the same as the network 503 described in the first embodiment.

[Hardware Arrangement]

The hardware arrangement of the mobile terminal 1401 of this embodiment is the same as that described with reference to FIG. 6A in the first embodiment and a description thereof will be omitted.

Figure 15:
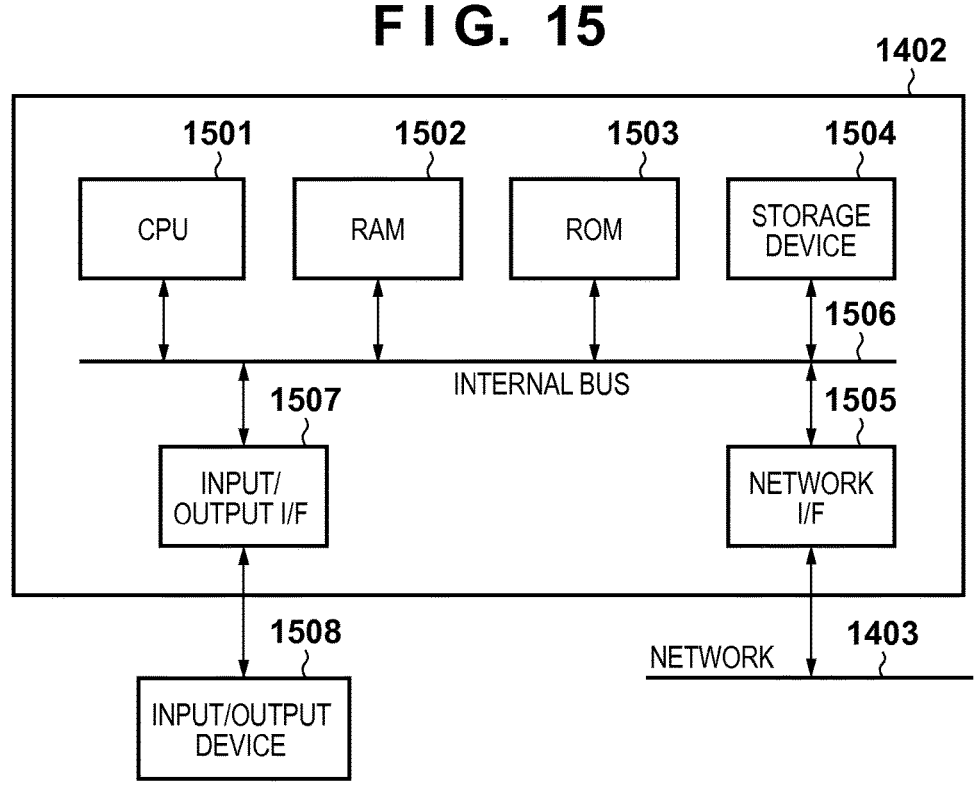
FIG. 15 is a view showing a hardware arrangement according to the second embodiment.

FIG. 15 is a block diagram showing the hardware arrangement of the Web Intents service 1402 according to this embodiment. The Web Intents service 1402 includes a CPU 1501 for executing programs stored in a ROM 1503, and comprehensively controls respective devices via an internal bus 1506. A RAM 1502, the ROM 1503, a storage device 1504, a network I/F 1505, and an input/output I/F 1507 are connected to the internal bus 1506. The input/output I/F 1507 includes, for example, a PS2 or Universal Serial Bus (USB I/F), and an analog or digital display I/F. An input/output device 1508 is a keyboard or mouse, or CRT or liquid crystal display. The user can connect to the Web Intents service 1402 via the input/output I/F 1507.

[Software Arrangement]

The software arrangement of the mobile terminal 1401 according to this embodiment is the same as that described with reference to FIG. 7A in the first embodiment and a description thereof will be omitted.

Figure 16:
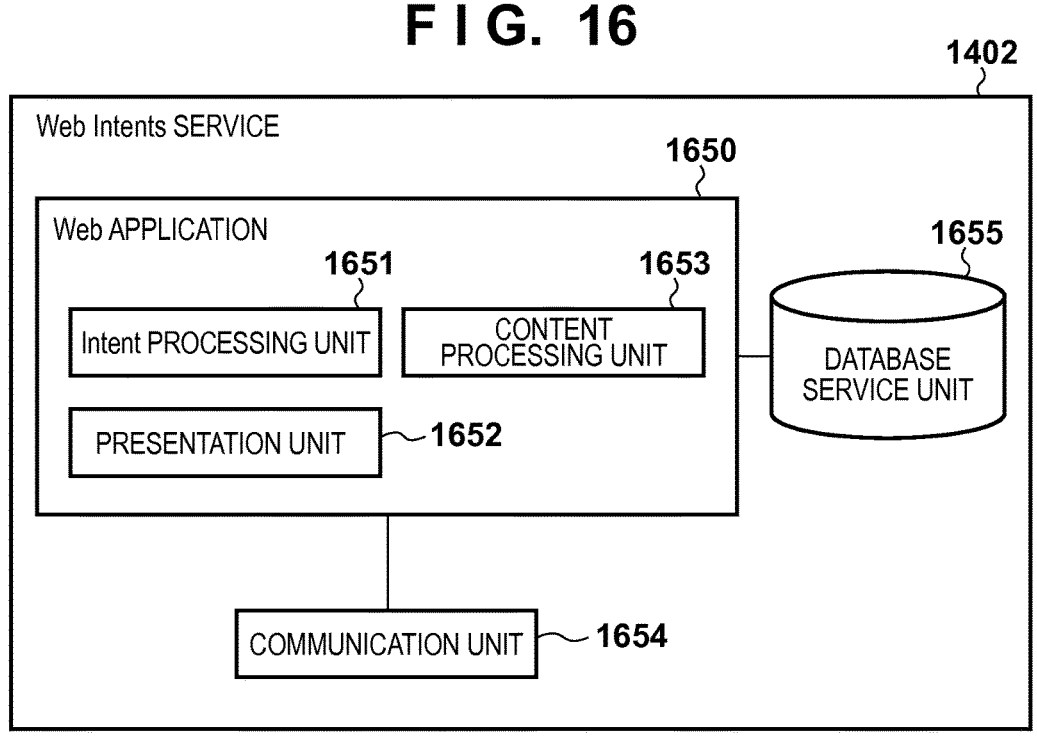
FIG. 16 is a view showing a software arrangement according to the second embodiment.

FIG. 16 is a block diagram showing the software arrangement of the Web Intents service 1402 according to this embodiment. In the Web Intents service 1402, a Web application 1650 and respective processing units exist as files saved in the storage device 1504 of the Web Intents service 1402. These files are program modules which are loaded into the RAM 1502 at the time of execution by an OS or another processing unit that uses each processing unit, and then executed.

The Web application 1650 is an application for providing a storage function of saving a content such as image data, and a function of editing a content. The Web application 1650 is implemented as a program for executing processing in response to an HTTP request. The Web application 1650 includes an Intent processing unit 1651, a presentation unit 1652, and a content processing unit 1653.

The Intent processing unit 1651 analyzes an Intent object, and instructs another processing unit to perform processing in response to a request from the mobile terminal 1401. The presentation unit 1652 creates an HTML document in response to a page obtaining request or the like received via a communication unit 1654. Upon receiving an instruction from the Intent processing unit 1651, the content processing unit 1653 processes the content. The content processing unit 1653, for example, edits image data, and stores a content in the storage device 1504 via a database service unit 1655 in response to a request. In response to a request from another processing unit, the database service unit 1655 stores and extracts data. The database service unit 1655 may be provided in another device different from the Web Intents service 1402.

[Table Structure]

FIG. 17A shows an example of a registered Web Intents service table held for an OS unit 710 of the mobile terminal 1401 to manage the Web Intents services 103 registered in the mobile terminal. A registered Web Intents service table 1710 is held in a storage device 604 of the mobile terminal 1401, and controlled by a database service unit 720. Pieces of information 1711 to 1716 included in the registered Web Intents service table 1710 are the same as those 811 to 816 described in the first embodiment and a description thereof will be omitted. An "account type" 1717 indicates account information necessary to use the Web Intents service 103.

FIG. 17B shows an example of an account management table held by the OS unit 710 of the mobile terminal 1401. An account managed in an account management table 1720 is used by the user to access various services via the mobile terminal 1401. A "user id" 1721 indicates a user ID used to use the Web Intents service 103. A "password" 1722 indicates a password for the "user id" 1721. A "status" 1723 indicates the login state of the account, and indicates the login state of each account in the mobile terminal 1401. An "account type" 1724 indicates the Web Intents service 1402 corresponding to the account. The "account type" 1724 of the account management table 1720 corresponds to a value indicated by the "account type" 1717 of the registered Web Intents service table 1710.

In this embodiment, it is indicated that the user is in the login state using a user id "b" in the mobile terminal 501 for "bbb Share Service" whose "Service ID" is "2". In this case, it is not necessary to perform authentication processing again to use "bbb Share Service" and "bbb Edit Service" whose "account type" is "BBB".

[Processing Request Issuance Sequence]

Figure 18:
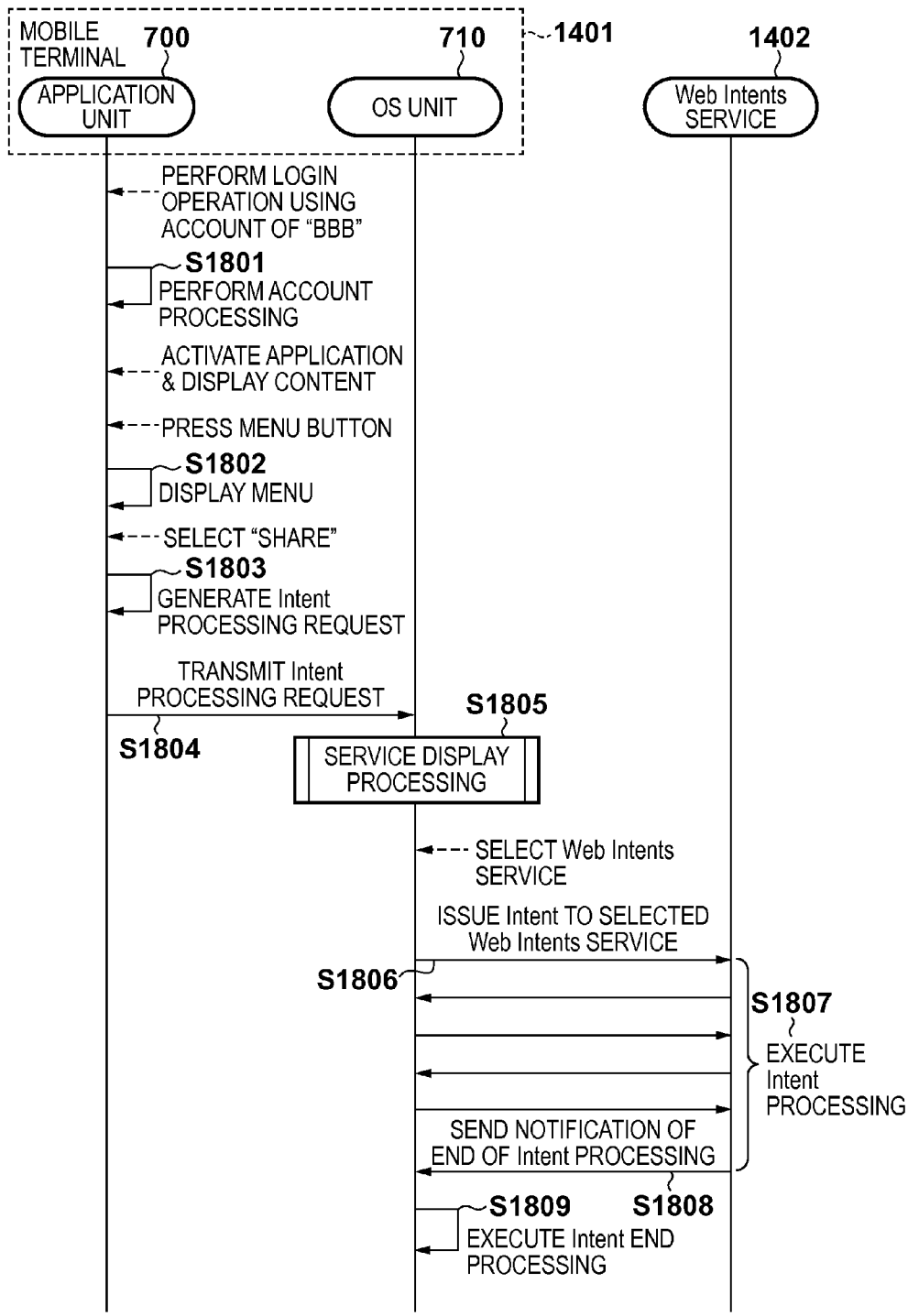
FIG. 18 is a sequence chart when the mobile terminal issues Intents to a Web Intents service according to the second embodiment.

FIG. 18 is a sequence chart when the mobile terminal 1401 issues an Intents processing request to the Web Intents service 1402. In this embodiment, a sequence of displaying a content using an application in the mobile terminal 1401, and requesting the Web Intents service 1402 to process the content will be described. As in the first embodiment, processing will be explained from a point where the application unit 700 processes the content when the Web Intents service 1402 has already been registered in the mobile terminal 1401.

Figure 19A:
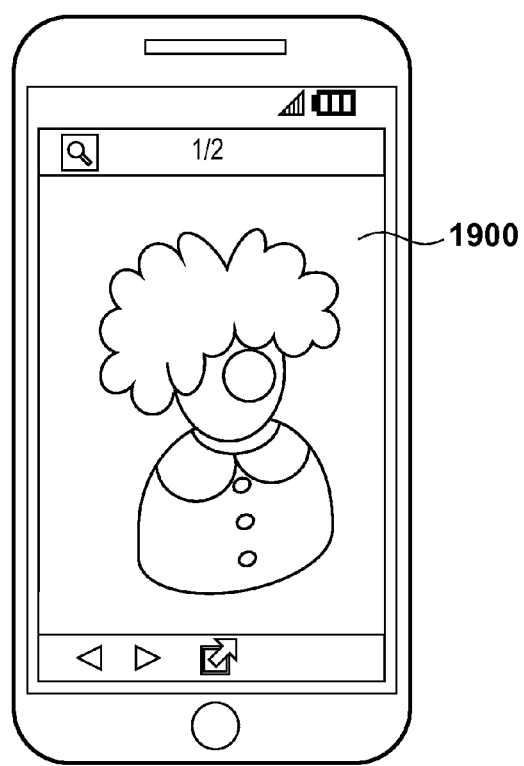
FIGS. 19A and 19B are views each showing an example of the screen of the mobile terminal according to the second embodiment.
Figure 19B:
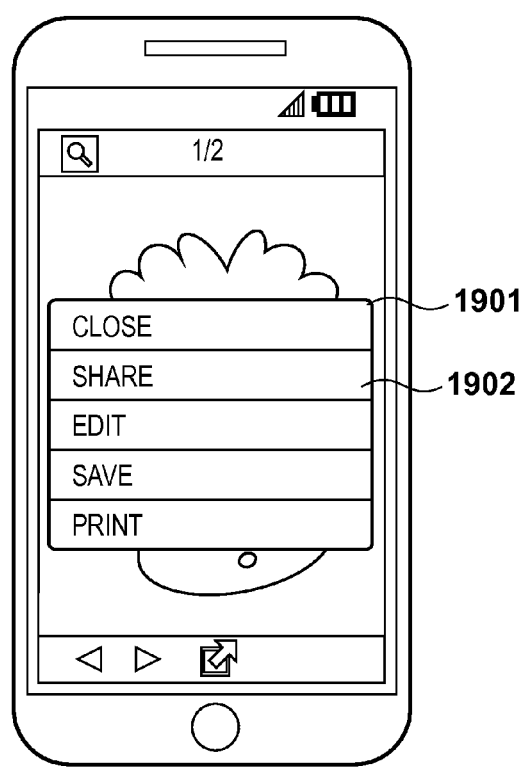

The user logs in to the mobile terminal 1401 using a given account by performing a user operation. In this embodiment, assume that the user logs in to the terminal using the user id "b". In response to the login operation, the application unit 700 performs account processing in S1801. More particularly, "in" representing the login state is set in the "status" 1723 of the account management table 1720. An application is activated by a user operation, and a target content is displayed. FIG. 19A shows a state in which a content 1900 is displayed by the application unit 700. After that, when the menu button (not shown) of the application is pressed by a user operation, in S1802 the application unit 700 detects pressing of the menu button, and displays a menu screen. FIG. 19B shows a state in which a menu screen 1901 is displayed after the menu button is pressed.

When the menu screen 1901 is displayed, and the user selects a "share" button 1902, the application unit 700 generates an Intent processing request in S1803. The generated processing request contains the type of the target content, a path, and the action of the selected menu. Since this embodiment assumes that the target content is to be shared with (provided to) the Web Intents service 1402, "image/*" is designated as the type and "share" is designated as the action. In S1804, the application unit 700 transmits the generated Intent processing request to the OS unit 710. Upon receiving the Intent processing request from the application unit 700, the OS unit 710 performs service display processing in S1805.

Figure 20:
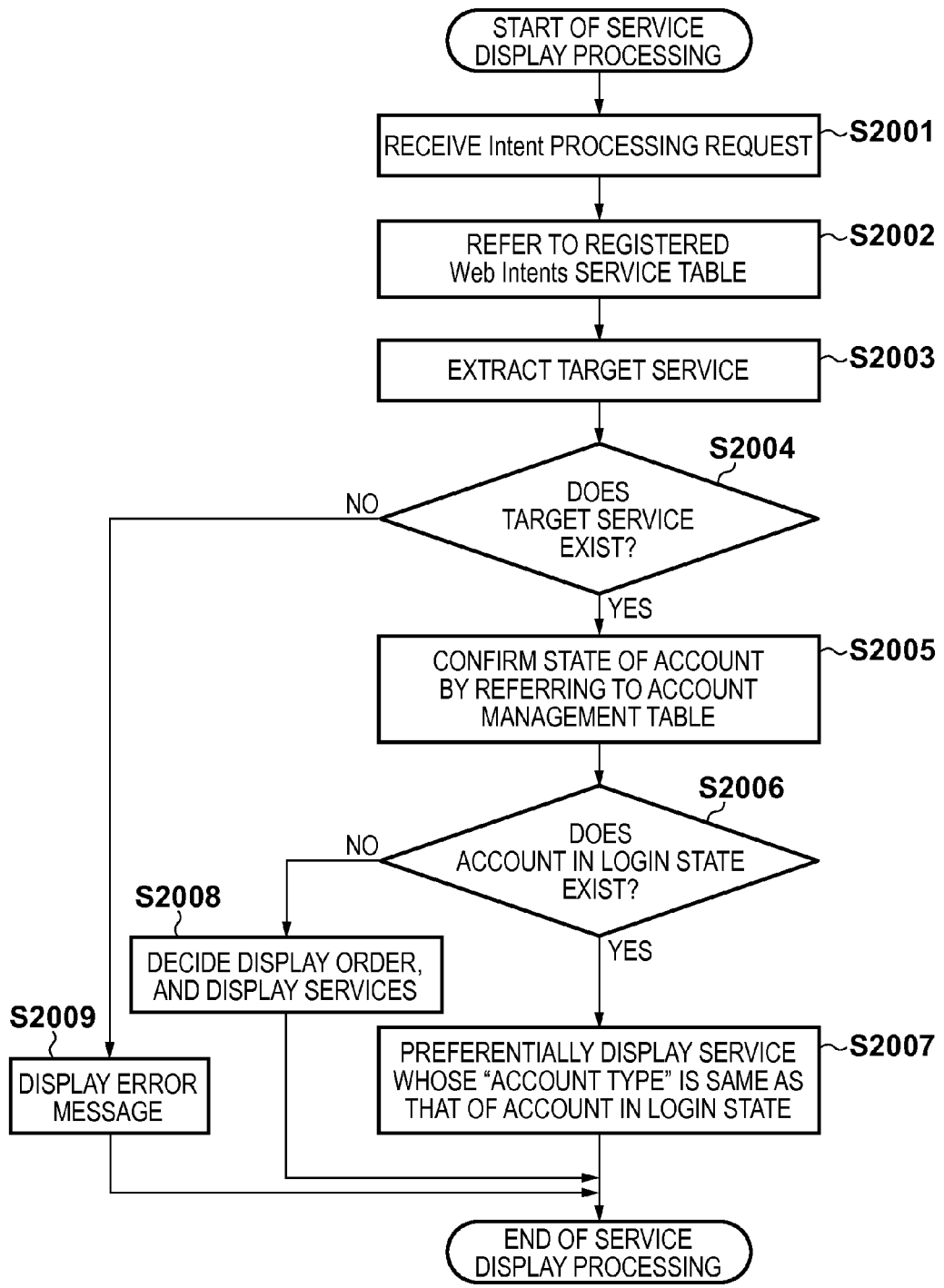
FIG. 20 is a flowchart illustrating the service display processing of the OS unit of the mobile terminal according to the second embodiment.

The service display processing in S1805 will be described with reference to a flowchart shown in FIG. 20. In step S2001, the OS unit 710 receives the Intent processing request generated by the application unit 700. In step S2002, the OS unit 710 refers to the registered Web Intents service table 1710. In step S2003, the OS unit 710 compares the contents of the registered Web Intents service table 1710 with the contents of the request, and extracts a target Web Intents service 103. In this example, the Web Intents services 103 whose "type" is "image/*" and whose "action" is "share" are targets. In the example shown in FIG. 17A, more specifically, the Web Intents services each of which has "1", "2", or "5" as the "Service ID" are extracted.

In step S2004, the OS unit 710 confirms whether a target service exists in the extraction processing in step S2003. If it is confirmed in step S2004 that no target service exists (NO in step S2004), in step S2009 the OS unit 710 displays an error message, and ends the service display processing. FIG. 21A shows an example of a message display screen 2101.

If it is confirmed in step S2004 that a target service exists (YES in step S2004), in step S2005 the OS unit 710 confirms the login state of each account by referring to the account management table 1720. In step S2006, the OS unit 710 confirms whether there exists an account in the login state. If it is confirmed in step S2006 that there exists an account in the login state (YES in step S2006), in step S2007 the OS unit 710 confirms the "account type" 1724 of the account in the login state. The OS unit 710 extracts the Web Intents service 103 having the "account type" 1717 whose value is equal to that of the "account type" 1724, and decides the display order of the Web Intents services 103 so that the extracted Web Intents service 103 is displayed at a higher position. In this embodiment, since the "account type" 1724 of the user id "b" of the account in the login state indicates "BBB", the display order is decided so that "bbb Share Service" is displayed at a higher position.

FIG. 21B shows a list 2102 of the Web Intents services 103 displayed at this time. In this example, there are three share services, and "bbb Share Service" whose "account type" 1724 is the same as that of the account in the login state is displayed at the highest position.

If it is confirmed in step S2006 that there is no account in the login state (NO in step S2006), in step S2008 the OS unit 710 decides the display order according to a given rule, and displays the services. The given rule is a general sort rule such as the alphabetical order or JIS code order. Assume that a rule to be used here is defined in advance, and managed by the OS unit 710. If there exist a plurality of Web Intents services 103 to be displayed at higher positions, that is, if there exist a plurality of Web Intents services 103 whose "account type" 1717 is "BBB", the display order is decided according to the given rule. After that, the processing sequence ends to return to the sequence of FIG. 18.

After that, when the user selects a given Web Intents service 103 from the menu displayed by the OS unit 710, the OS unit 710 issues an Intent for the selected Web Intents service 103 in S1806. In this embodiment, the OS unit 710 of the mobile terminal 1401 requests the Web Intents service 1402 to perform processing. At this time, the OS unit 710 includes contents of the request and content transmitted by the application unit 700 in S1804 in transmission data to the Web Intents service 1402.

In S1807, the Intent processing unit 1651 of the Web Intents service 1402 extracts an Intent object from the request issued in S1806, and analyzes it, thereby starting Intent processing. In this embodiment, the Intent processing unit 1651 of the Web Intents service 1402 provides a service of sharing the content included in the Intent object while interacting with the user via the OS unit 710 of the mobile terminal 1401. In S1808, upon completion of the Intent processing, the Web Intents service 1402 notifies the OS unit 710 of the mobile terminal 1401 of a processing result.

In S1809, the OS unit 710 notifies the user of the result by, for example, displaying the Intent processing result notified from the Web Intents service 1402 on a screen. FIG. 21C shows a result display screen 2103 for the processing result displayed by the OS unit 710.

Note that this embodiment assumes that there is one account in the login state. If, however, there are a plurality of accounts in the login state, the display order may be decided according to a predetermined rule. For example, in combination with the arrangement of the first embodiment, the Web Intents service 1402 whose development vendor is the same as that of the mobile terminal 1401 may be preferentially displayed.

As described above, it is possible to provide display with high usability to the first embodiment by using the login state as reference information as in this embodiment.

Third Embodiment

In the third embodiment, a method of deciding a display order depending on whether a Web Intents service 103 is local application/service or a Web application/service to be used via a network will be described.

The relationship between a Web Intents client 101, a UA 102, and the Web Intents service 103 according to this embodiment is the same as that shown in FIG. 14 described in the second embodiment and a description thereof will be omitted. In this embodiment as well, assume that the Web Intents client 101 corresponds to an application portion of a mobile terminal 1401 and the UA 102 corresponds to an OS portion. The hardware arrangements and software arrangements of the mobile terminal 1401 and a Web Intents service 1402 are the same as those shown in FIGS. 6A, 15, 7A, and 16, respectively, and a description thereof will be omitted.

[Table Structure]

FIG. 22 shows an example of a registered Web Intents service table held for an OS unit 710 of the mobile terminal 1401 to manage the Web Intents services 103 registered in the mobile terminal. A registered Web Intents service table 2210 is held in a storage device 604 of the mobile terminal 1401, and controlled by a database service unit 720. Pieces of information 2211 to 2216 of the registered Web Intents service table 2210 are the same as those 811 to 816 described in the first embodiment and a description thereof will be omitted.

[Processing Request Issuance Sequence]

FIG. 23 is a sequence chart when the mobile terminal 1401 issues an Intent processing request to the Web Intents service 1402. Processes in S2301 to S2308 except for service display processing in S2304 are the same as those described in the first embodiment and a description thereof will be omitted.

Figure 24:
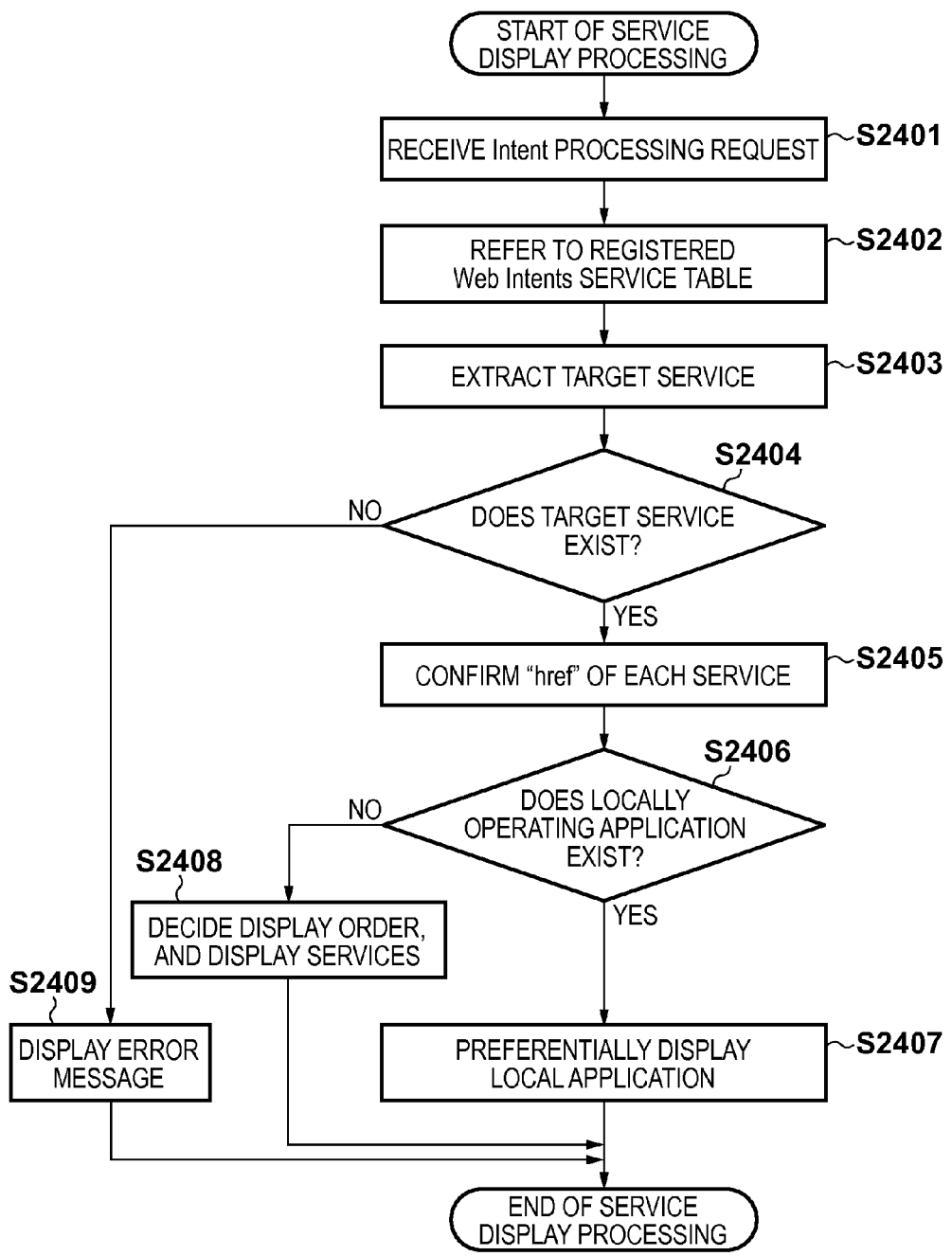
FIG. 24 is a flowchart illustrating the service display processing of the OS unit of the mobile terminal according to the third embodiment.

The service display processing in S2304 will be described with reference to a flowchart shown in FIG. 24. Processes in steps S2401 to S2404 are the same as those in steps S2001 to S2004 described in the second embodiment and a description thereof will be omitted.

If it is confirmed in step S2404 that a target service exists (YES in step S2404), in step S2405 the OS unit 710 confirms an "href" 2214 of the target service by referring to the registered Web Intents service table 2210. The OS unit 710 determines based on the URL character string of the "href" 2214 whether the Web Intents service 103 is an application in the mobile terminal 1401 or a Web application/service to be used via a network 1403. In the example shown in FIG. 22, the character string "localhost" can be confirmed in the "href" 2214 of the Web Intents service whose "Service ID" is "2", thereby determining that the service is an application in the mobile terminal 1401. That is, it is possible to determine the position (in the local device/on the network) of a connection destination based on URL information.

Figure 25:
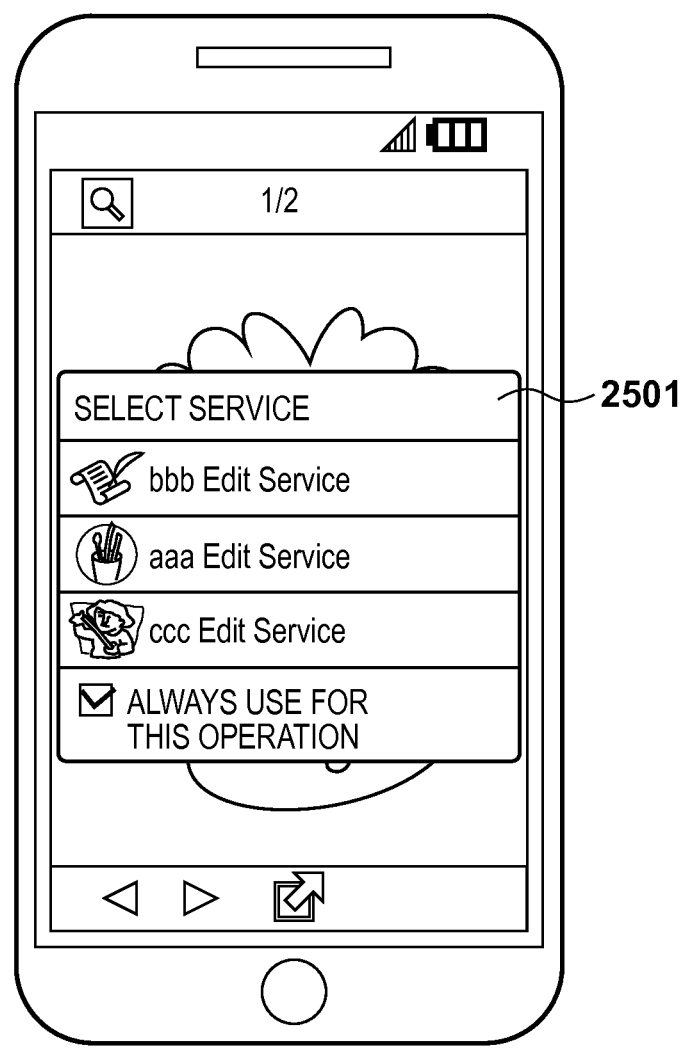
FIG. 25 is a view showing an example of the screen of the OS unit of the mobile terminal according to the third embodiment.

In step S2406, the OS unit 710 confirms whether a locally operating application/service exists in the registered Web Intents service table 2210. If it is confirmed in step S2406 that a locally operating application/service exists (YES in step S2406), in step S2407 the OS unit 710 decides a display order so that the local application/service is displayed at a higher position, and displays the services. In the example shown in FIG. 22, "bbb Edit Service" whose "Service ID" is "2" and whose "href" 2214 includes the character string "localhost" is displayed at the highest position. FIG. 25 shows a list 2501 of the Web Intents services 103 displayed at this time. If there exist a plurality of Web Intents services 103 to be displayed at higher positions, that is, if there exist a plurality of local applications/services, the display order is decided according to a given rule. The given rule defined in advance is a general sort rule such as the alphabetical order or JIS code order. Processes in steps S2408 and S2409 are the same as those in steps S2008 and S2009 described in the second embodiment and a description thereof will be omitted.

Referring to FIG. 23, processes in S2305 to S2308 after the processing in S2304 are the same as those in S1805 to S1808 of FIG. 18 described in the second embodiment and a description thereof will be omitted.

As described above, it is possible to provide display with high usability to the first embodiment by using the position of an application (a connection destination when using a service) as reference information as in this embodiment.

Note that the display order may be controlled in combination with the arrangements of the first and second embodiments.

Fourth Embodiment

In the fourth embodiment, a method of deciding a display order according to the state of a UA 102 will be described. The relationship between a Web Intents client 101, the UA 102, and a Web Intents service 103 according to this embodiment is the same as that shown in FIG. 14 described in the second embodiment and a description thereof will be omitted. In this embodiment as well, assume that the Web Intents client 101 corresponds to an application portion of a mobile terminal 1401, and the UA 102 corresponds to an OS portion. The hardware arrangements and software arrangements of the mobile terminal 1401 and a Web Intents service 1402 are the same as those shown in FIGS. 6A, 15, 7A, and 16, respectively, and a description thereof will be omitted. A registered Web Intents service table is the same as the registered Web Intents service table 2210 described in the third embodiment and a description thereof will be omitted.

[Processing Request Issuance Sequence]

In a sequence when the mobile terminal 1401 issues an Intents processing request to the Web Intents service 1402, processes except for service display processing are the same as those shown in FIG. 23. Therefore, processes in S2301 to S2308 are as described in the second embodiment.

Figure 26:
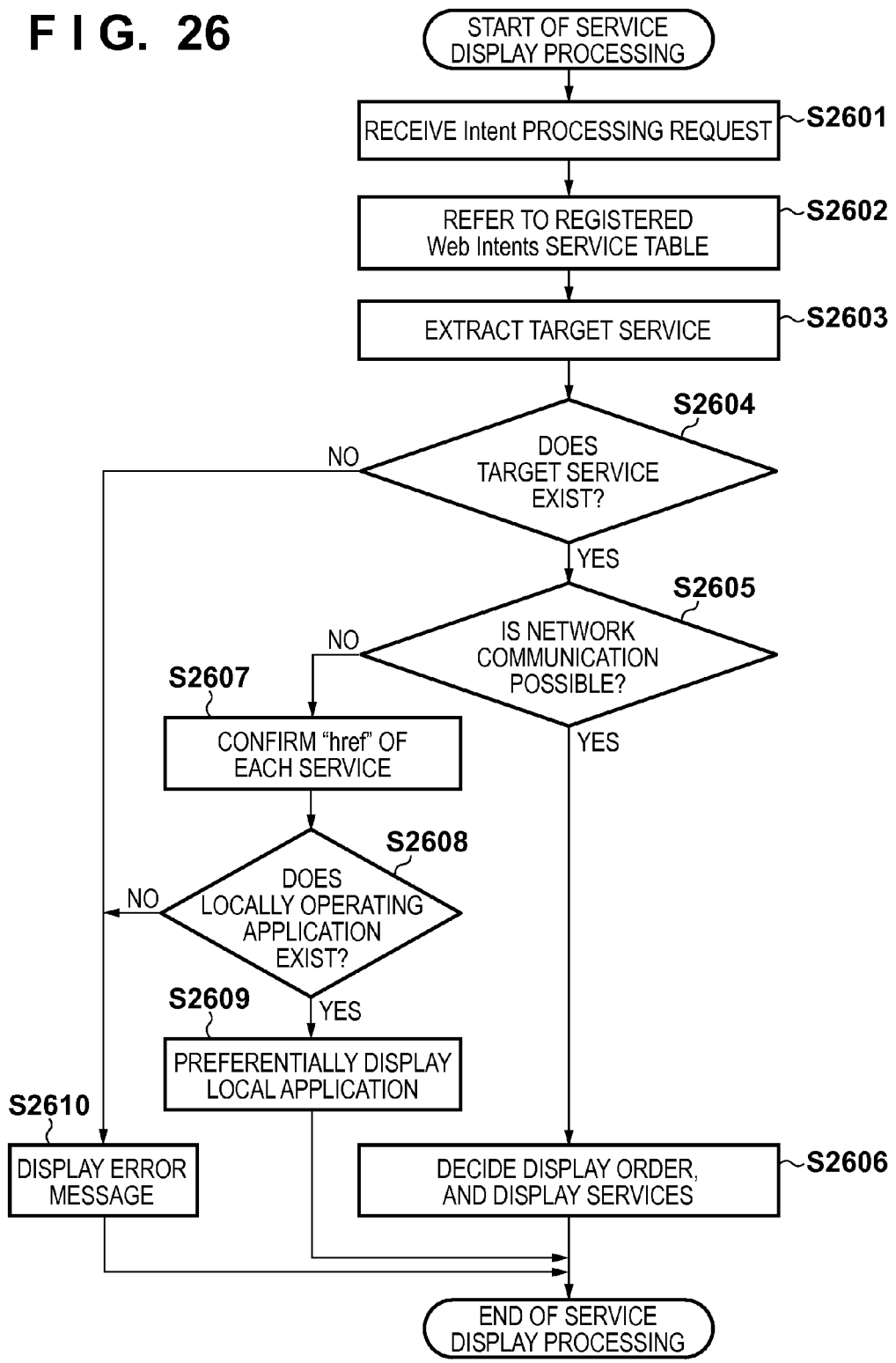
FIG. 26 is a flowchart illustrating the service display processing of the OS unit of a mobile terminal according to the fourth embodiment.

The service display processing in S2304 will be described with reference to a flowchart shown in FIG. 26. Processes in steps S2601 to S2604 are the same as those in steps S2001 to S2004 described in the second embodiment and a description thereof will be omitted.

If it is confirmed in step S2604 that a target service exists (YES in step S2604), an OS unit 710 confirms the communication state of the mobile terminal 1401 in step S2605. The communication state indicates whether communication with an external device via a network 1403 is possible, and is detected by a communication unit 714 of the OS unit 710. If it is confirmed in step S2605 that network communication by the mobile terminal 1401 is possible (YES in step S2605), in step S2606 the OS unit 710 decides a display order according to a given rule, and displays the services. The given rule is a general sort rule such as the alphabetical order or JIS code order. As a display order decision method, the method described in the first or second embodiment may be used.

If it is confirmed in step S2605 that network communication by the mobile terminal 1401 is impossible (NO in step S2605), in step S2607 the OS unit 710 confirms an "href" 2214 of the target service by referring to a registered Web Intents service table 2210. Based on the URL character string of the "href" 2214, the OS unit 710 determines whether the Web Intents service 103 is an application in the mobile terminal 1401 or a Web application/service to be used via the network 1403. In the example shown in FIG. 22, a character string "localhost" can be confirmed in the "href" 2214 of the Web Intents service whose "Service ID" is "2", thereby determining that the service is an application in the mobile terminal 1401.

In step S2608, the OS unit 710 determines whether a locally operating application/service exists in the registered Web Intents service table 2210. If it is confirmed in step S2608 that a locally operating application/service exists (YES in step S2608), in step S2609 the OS unit 710 decides the display order so that the local application/service is displayed at a higher position, and displays the services. In this embodiment, "bbb Edit Service" whose "Service ID" is "2" and whose "href" 2214 includes "localhost" is displayed at the highest position. FIG. 25 shows a list 2501 of the Web Intents services 103 displayed at this time. If there exist a plurality of Web Intents services 103 to be displayed at higher positions, that is, if there are a plurality of local applications/services, the display order is decided according to a given rule. The given rule is a general sort rule such as the alphabetical order or JIS code order.

If it is confirmed in step S2608 that no locally operating application/service exists (NO in step S2608), the OS unit 710 displays an error message in step S2610.

As described above, it is possible to provide display with high usability to the first embodiment by using the state of the UA as reference information as in this embodiment.

Note that the display order may be controlled in combination with the arrangements of the first to third embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-230526, filed Nov. 6, 2013, which is hereby incorporated by reference herein in its entirety.

What is claimed is:

1. An information processing terminal having a web browser functioning as a relay function, which relays, via a network, a client for managing data and a service for providing a function using the data managed by the client, the information processing terminal comprising:
    a processor;
    a storage device; and
    a memory storing a program for the relay function, wherein the program, when executed by the processor, causes the information processing terminal to:
        receive, upon receiving a message containing markup data for registering intent service information including location information for calling a function provided by a service executed by an external device with which the information processing terminal can communicate via the network, reference information pertaining to providing of the intent service information from the service, wherein the reference information is embedded as a parameter of one of a title attribute and href attribute forming the intent service information and includes information related to a service providing source of the service;
        execute registration processing for registering the intent service information into the storage device by the relay function according to the markup data contained in the received message;
        provide, in response to a designation of a function by a user on a screen provided by the client, the user with a list of pieces of the intent service information registered by the registration processing and service information corresponding to a local service executed in the information processing terminal, wherein the pieces of the intent service information in the list is displayed according to a display order or a display position based on the reference information, and the reference information is displayed in the list;
        transmit, to the service corresponding to the intent service information selected from the list, a request including information about the data managed by the client; and
        receive, from the service to which the request is transmitted, a response to be notified to the client,
    wherein the received response includes a result of processing for the data using the function provided by the service,
    wherein the result is related to processing for the data using a print function,
    wherein, in the provided list, displaying of the service information corresponding to the local service has a priority, and
    wherein the location information used for calling the function provided by the service is set to the href attribute forming the intent service information.

2. The terminal according to claim 1, wherein the network is the Internet.

3. The terminal according to claim 1, wherein the client and the relay function are functions operating on the information processing terminal.

4. The terminal according to claim 1, wherein one of "share", "edit", "view", "pick", and "save" is described in the intent service information as specification information for the function.

5. The terminal according to claim 1, wherein the reference information includes one of the function provided by the service or a state of the service.

6. The terminal according to claim 1, wherein the reference information includes account information.

7. The terminal according to claim 1, wherein the registered intent service information corresponding to a service executed by an external device with which the information processing terminal became not able to communicate is not provided to the user in the list.

8. A control method for an information processing terminal having a web browser functioning as a relay function, which relays, via a network, a client for managing data and a service for providing a function using the data managed by the client, comprising:
    upon receiving a message containing markup data for registering intent service information including location information for calling a function provided by a service executed by an external device with which the information processing terminal can communicate via the network, receiving reference information pertaining to providing of the intent service information from the service, wherein the reference information is embedded as a parameter of one of a title attribute and href attribute forming the intent service information and includes information related to a service providing source of the service;
    executing registration processing for registering the received intent service information into a storage device by the relay function according to the markup data contained in the received message;
    providing, in response to a designation of a function by a user on a screen provided by the client, the user with a list of pieces of the intent service information registered by the registration processing and service information corresponding to a local service executed in the information processing terminal, wherein the pieces of the intent service information in the list is displayed according to a display order or a display position based on the reference information, and the reference information is displayed in the list;

transmitting, to the service corresponding to the intent service information selected from the list, a request including information about the data managed by the client; and receiving, from the service to which the request is transmitted, a response to be notified to the client, wherein the received response includes a result of processing for the data using the function provided by the service, wherein the result is related to processing for the data using a print function, wherein, in the provided list, displaying of the service information corresponding to the local service has a priority, and wherein the location information used for calling the function provided by the service is set to the href attribute forming the intent service information.

9. A non-transitory computer-readable medium storing a program for causing a computer, having a web browser functioning as a relay function, which relays, via a network, a client for managing data and a service for providing a function using the data managed by the client, to:

receive, upon receiving a message containing markup data for registering intent service information including location information for calling a function provided by a service executed by an external device with which an information processing terminal can communicate via the network, reference information pertaining to providing of the intent service information from the service, wherein the reference information is embedded as a parameter of one of a title attribute and href attribute forming the intent service information and includes information related to a service providing source of the service;

execute registration processing for registering the received intent service information into a storage device by the relay function according to the markup data contained in the received message;

provide, in response to a designation of a function by a user on a screen provided by the client, the user with a list of pieces of the intent service information registered by the registration processing and service information corresponding to a local service executed in the information processing terminal, wherein the pieces of the intent service information in the list is displayed according to a display order or a display position based on the reference information, and the reference information is displayed in the list;

transmit, to the service corresponding to the intent service information selected from the list, a request including information about the data managed by the client; and receive, from the service to which the request is transmitted, a response to be notified to the client, wherein the received response includes a result of processing for the data using the function provided by the service, wherein the result is related to processing for the data using a print function, wherein, in the provided list, displaying of the service information corresponding to the local service has a priority, and wherein the location information used for calling the function provided by the service is set to the href attribute forming the intent service information.

* * * * *